US012624181B2

(12) United States Patent
Sontag et al.

(10) Patent No.: US 12,624,181 B2
(45) Date of Patent: May 12, 2026

(54) FLUORINE-FREE HYDROPHOBIC PERMEABLE MATERIAL

(71) Applicant: Donaldson Company, Inc., Bloomington, MN (US)

(72) Inventors: Stephen K. Sontag, Plymouth, MN (US); Mikayla A. Yoder, Eagan, MN (US); Matthew P. Goertz, Bloomington, MN (US); Davis B. Moravec, Burnsville, MN (US)

(73) Assignee: Donaldson Company, Inc., Bloomington, MN (US)

( * ) Notice: Subject to any disclaimer, the term of this patent is extended or adjusted under 35 U.S.C. 154(b) by 229 days.

(21) Appl. No.: 18/622,037

(22) Filed: Mar. 29, 2024

(65) Prior Publication Data

US 2024/0327598 A1 Oct. 3, 2024

Related U.S. Application Data

(60) Provisional application No. 63/612,164, filed on Dec. 19, 2023, provisional application No. 63/456,327, filed on Mar. 31, 2023.

(51) Int. Cl.
C08J 9/36 (2006.01)
B65D 51/16 (2006.01)
C09D 183/04 (2006.01)

(52) U.S. Cl.
CPC .......... C08J 9/365 (2013.01); B65D 51/1616 (2013.01); C09D 183/04 (2013.01); C08J 2301/12 (2013.01); C08J 2483/04 (2013.01)

(58) Field of Classification Search
CPC .... C08J 9/365; C08J 2301/12; C08J 2483/04; B65D 51/1616; C09D 183/04
USPC .......................................................... 428/98
See application file for complete search history.

(56) References Cited

U.S. PATENT DOCUMENTS

| | | | |
|---|---|---|---|
| 6,196,409 B1 | 3/2001 | Lake et al. | |
| 6,355,081 B1 | 3/2002 | Wang et al. | |
| 8,220,649 B2 | 7/2012 | Walsh | |
| 11,155,393 B2 | 10/2021 | Fisch | |
| 2002/0139095 A1* | 10/2002 | Wang ................ | D06M 15/3568 |
| | | | 55/385.4 |
| 2024/0327598 A1* | 10/2024 | Sontag ............... | B01D 67/0088 |

OTHER PUBLICATIONS

International Search Report and Written Opinion for International Application No. PCT/US2024/022307, mailed Aug. 14, 2024, 12 Pages.

(Continued)

*Primary Examiner* — Betelhem Shewareged
(74) *Attorney, Agent, or Firm* — Mueting Raasch Group

(57) ABSTRACT

An article includes a permeable material having a surface; and a hydrophobic coating on the surface forming a hydrophobic surface, the hydrophobic coating being free of fluorine, and the hydrophobic surface having a water-contact angle of 95 degrees or greater. The article may be a vent. A method of making the hydrophobic article includes applying a hydrophobic material onto a permeable material; and curing the hydrophobic material to form a hydrophobic surface. The hydrophobic coating may include siloxane.

31 Claims, 11 Drawing Sheets

(56) References Cited

OTHER PUBLICATIONS

Jahan I., et al., "Creating an Interconnected PVA Nanofibrous Membrane on Cotton Fabrics by Dip-coating of PDMS-TMS for Versatile Protection Without Compromising Comfort", Cellulose, Springer Netherlands, Netherlands, vol. 26, No. 13, Aug. 14, 2019, pp. 8179-8190, XP036875626, the whole document, ISSN: 0969-0239, DOI: 10.1007/S10570-019-02667-8.

Jiao L., et al., "Low Surface Energy Nano?brous Membrane for Enhanced Wetting Resistance in Membrane Distillation Process", Desalination, Elsevier, Amsterdam, NL, vol. 476, Nov. 20, 2019, pp. 1-8, XP085964552, the whole document, ISSN: 0011-9164, DOI:10.1016/J.DESAL.2019.114210.

Rutkevicius M., et al., "Creating Superhydrophobic, Abrasion-resistant and Breathable Coatings from Water-borne Polydimethylsiloxane-Polyurethane Co-polymer and Fumed Silica", Journal of Colloid and Interface Science, Academic Press, Inc, US, vol. 596, Mar. 2, 2021, pp. 479-492, XP086556214, the whole document, ISSN: 0021-9797, DOI: 10.1016/J.JCIS.2021.02.072.

Wang F., et al., "Eco-friendly and Superhydrophobic Nano-starch Based Coatings for Self-cleaning Application and Oil-water Separation", Carbohydrate Polymers, Applied Science Ublishers, Ltd Barking, GB, vol. 271, Jul. 8, 2021, pp. 1-11, XP086720275, the whole document, ISSN: 0144-8617, DOI: 10.1016/J.CARBPOL.2021.118410.

* cited by examiner

1
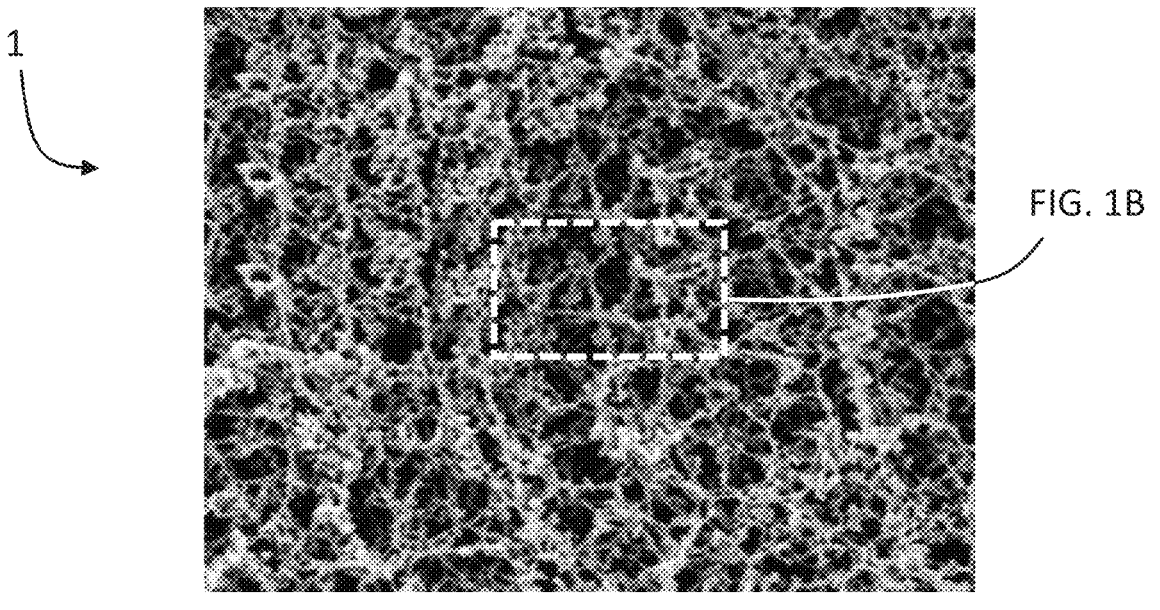
FIG. 1B
FIG. 1A
1
11
10
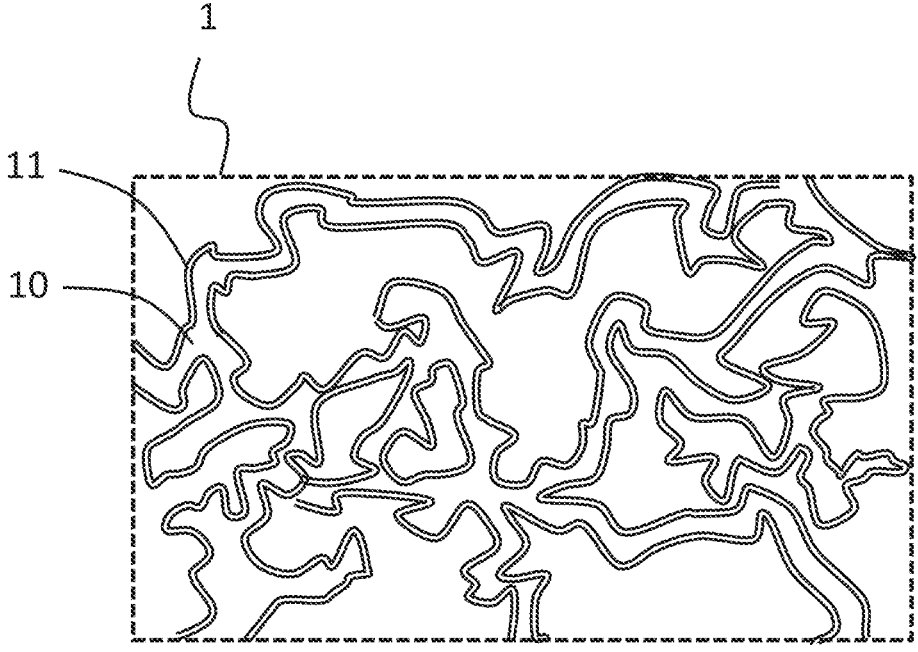
FIG. 1B

20

21

31

30

SEM Media B with Coating 8 (3 w/v%)

SEM Media C with Coating 1 (3 w/v%)

SEM Media D with Coating 1 (3 w/v%)

SEM Media E with Coating 3 (3 w/v%)

SEM Media F with Coating 3 (3 w/v%)

SEM Media G with Coating 1 (3 w/v%)

FLUORINE-FREE HYDROPHOBIC PERMEABLE MATERIAL

CROSS-REFERENCE TO RELATED APPLICATIONS

This application claims the benefit of U.S. Provisional Patent Application No. 63/456,327, filed Mar. 31, 2023, and of U.S. Provisional Patent Application No. 63/612,164, filed Dec. 19, 2023, which are incorporated herein by reference in their entireties.

FIELD

The present disclosure relates to fluorine-free hydrophobic permeable materials. The present disclosure further relates to fluorine-free hydrophobic permeable membranes.

BACKGROUND

Many enclosures require venting to an external atmosphere to release waste gas or to relieve a pressure differential. Venting may be necessary as a result of temperature fluctuations, altitude changes, and vapor pressure of contained liquids. Vents, or venting media, equalize pressure by allowing gas to flow through while repelling liquids and solids to protect internal components. Vents and venting media that repel water may have a hydrophobic surface. Typically, such a hydrophobic surface is achieved by using a fluorinated chemical coating. Further improvements with permeable hydrophobic materials are desired.

SUMMARY

According to an embodiment, an article includes: a permeable material having a surface; and a hydrophobic coating on the surface forming a hydrophobic surface, the hydrophobic coating being free of fluorine, and the hydrophobic surface having a water-contact angle of 95 degrees or greater.

According to an embodiment, a permeable membrane includes: a permeable material having a surface; and a hydrophobic coating on the surface forming a hydrophobic surface, the hydrophobic coating being free of fluorine, and the hydrophobic surface having a water-contact angle of 95 degrees or greater.

According to an embodiment, a permeable membrane includes: a permeable material having a surface; and a hydrophobic coating on the surface forming a hydrophobic surface, the hydrophobic coating being free of fluorine, and the hydrophobic surface exhibiting a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller with a liquid having a surface tension of 35 mN/m or greater.

According to an embodiment, a vent includes: a permeable material having a surface; and a hydrophobic coating on the surface forming a hydrophobic surface, the hydrophobic coating being free of fluorine, and the hydrophobic surface having a water-contact angle of 95 degrees or greater.

According to an embodiment, a vented cap includes: a cap constructed for use on a container; and a vent disposed within the cap, where the vent includes: a permeable material having a surface; a hydrophobic coating on the surface forming a hydrophobic surface, the hydrophobic coating being free of fluorine, and the hydrophobic surface having a water-contact angle of 95 degrees or greater.

The hydrophobic surface may have a water contact angle of 100 degrees or greater, 105 degrees or greater, 110 degrees or greater, 120 degrees or greater, 130 degrees or greater, 135 degrees or greater, 140 degrees or greater, 145 degrees or greater, or 150 degrees or greater. The hydrophobic surface may exhibit a roll-off angle of 20 degrees or lower, 15 degrees or lower, 10 degrees or lower, 8 degrees or lower, or 5 degrees or lower. The hydrophobic surface may exhibit a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.45 of smaller, or 0.4 or smaller in contact with a liquid having a surface tension of 35 mN/m or greater. The hydrophobic surface may exhibit a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.4 or smaller, 0.35 or smaller 0.3 or smaller, 0.25 or smaller, or 0.2 or smaller in contact with a liquid having a surface tension of 40 mN/m or greater.

According to an embodiment, the permeable material may include a phase-inverted membrane. The permeable material may include cellulose acetate, PES, or a combination thereof. The hydrophobic coating may include siloxane, such as a polyalkylsiloxane, such as polydimethylsiloxane. According to an embodiment, the article or permeable membrane or vent is free of fluorine.

According to an embodiment, an article includes: a permeable material having a surface; and a hydrophobic coating on the surface forming a hydrophobic surface, the hydrophobic coating being free of fluorine, and the hydrophobic surface having a water-contact angle in a range from 95 degrees to 115 degrees and a wetted fraction in a range of 0.75 to 0.95 in contact with a liquid having a surface tension of 35 mN/m or greater. The permeable material may include PES. The hydrophobic coating may include polyalkylsiloxane. The hydrophobic coating may include polydimethylsiloxane.

According to an embodiment, a vent includes: a permeable material having a surface; and a hydrophobic coating on the surface forming a hydrophobic surface, the hydrophobic coating being free of fluorine, and the hydrophobic surface having a water-contact angle in a range from 95 degrees to 115 degrees and a wetted fraction in a range of 0.75 to 0.95 in contact with a liquid having a surface tension of 35 mN/m or greater. The permeable material may include PES. The hydrophobic coating may include polyalkylsiloxane. The hydrophobic coating may include polydimethylsiloxane.

According to an embodiment, a vented cap includes: a cap constructed for use on a container; and a vent disposed within the cap, where the vent includes: a permeable material having a surface; a hydrophobic coating on the surface forming a hydrophobic surface, the hydrophobic coating being free of fluorine, and the hydrophobic surface having a water-contact angle in a range from 95 degrees to 115 degrees and a wetted fraction in a range of 0.75 to 0.95 in contact with a liquid having a surface tension of 35 mN/m or greater. The permeable material may include PES. The hydrophobic coating may include polyalkylsiloxane. The hydrophobic coating may include polydimethylsiloxane.

A method of making a hydrophobic article includes: applying a hydrophobic material onto a permeable material; and curing the hydrophobic material to form a hydrophobic surface, the hydrophobic material being free of fluorine, and the hydrophobic surface having a water-contact angle of 120 degrees or greater. The hydrophobic material may be applied by dip coating or chemical vapor deposition. The hydrophobic material may be applied in the form of an emulsion including the hydrophobic material. The curing of the hydrophobic material may include crosslinking the hydrophobic material.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF FIGURES

FIG. 1A is a scanning electron microscope (SEM) image of a hydrophobic permeable material.

FIG. 1B is a schematic close-up view of the material of FIG. 1A.

DEFINITIONS

Figure 2:
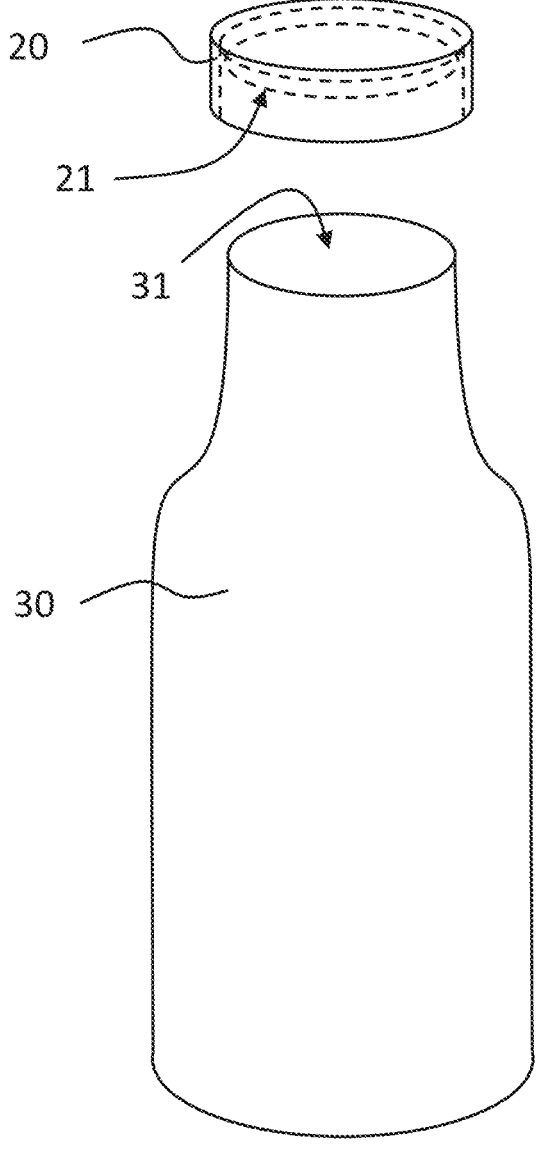
FIG. 2 is a schematic view of a container including a vented cap according to an embodiment.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, the terms "polymer" and "polymeric material" include, but are not limited to, organic homopolymers, copolymers, such as for example, block, graft, random and alternating copolymers, terpolymers, etc., and blends and modifications thereof.

Furthermore, unless otherwise specifically limited, the term "polymer" shall include all possible geometrical configurations of the material. These configurations include, but are not limited to, isotactic, syndiotactic, and atactic symmetries.

The term "aromatic ring" is used in this disclosure to refer to a conjugated ring system of an organic compound. Aromatic rings may include carbon atoms only, or may include one or more heteroatoms, such as oxygen, nitrogen, or sulfur.

The term "alkylated" is used in this disclosure to describe compounds that are reacted to replace a hydrogen atom or a negative charge of the compound with an alkyl group, such that the alkyl group is covalently bonded to the compound.

The term "alkyl" is used in this disclosure to describe a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, etc.

The term "hydrophobic" is used here to refer to a material property where the material has a water contact angle of greater than 90°, while "hydrophilic" materials are defined as materials with a water contact angle less than 90°. A material may be called "superhydrophobic" if it has a water contact angle of 150° or greater. Hydrophobicity and hydrophilicity can be measured by measuring the water contact angle of a material using ASTM D7334-08R22 test method, or by using an automated contact angle tester and ASTM D5725-99 test method. The term "wettable" is used here to refer refers to a material that allows a fluid to spread evenly across its surface. Wettability may be measured using the same water contact angle test methods.

The term "conformal" is used here to refer to a coating that follows the surface contours of the underlying layer so that the coating is present on the whole surface irrespective of surface roughness or defects. The term "non-conformal" refers to a coating that does not follow the surface contours of the underlying layer and is not present on the whole surface irrespective of surface roughness or defects.

The term "substantially" as used here has the same meaning as "significantly," and can be understood to modify the term that follows by at least about 90%, at least about 95%, or at least about 98%. The term "substantially free" of a particular compound means that the compositions of the present invention contain less than 1,000 parts per million (ppm) of the recited compound. The term "free" of a particular compound means that the compositions of the present invention contain less than 20 parts per billion (ppb) of the recited compound. In the context of the aforementioned phrases, the compositions of the present invention contain less than the aforementioned amount of the compound whether the compound itself is present in unreacted form or has been reacted with one or more other materials.

The term "not substantially" as used here has the same meaning as "not significantly," and can be understood to have the inverse meaning of "substantially," i.e., modifying the term that follows by not more than 25%, not more than 10%, not more than 5%, or not more than 2%.

The term "about" is used here in conjunction with numeric values to include normal variations in measurements as expected by persons skilled in the art, and is understood to have the same meaning as "approximately" and to cover a typical margin of error, such as ±5% of the stated value.

Terms such as "a," "an," and "the" are not intended to refer to only a singular entity, but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

As used here, "have," "having," "include," "including," "comprise," "comprising," or the like are used in their open-ended sense, and generally mean "including, but not limited to." It will be understood that "consisting essentially of," "consisting of," and the like are subsumed in "comprising" and the like. As used herein, "consisting essentially of," as it relates to a composition, product, method, or the like, means that the components of the composition, product, method, or the like are limited to the enumerated components and any other components that do not materially affect the basic and novel characteristic(s) of the composition, product, method, or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Any direction referred to here, such as "top," "bottom," "left," "right," "upper," "lower," and other directions and orientations are described herein for clarity in reference to the figures and are not to be limiting of an actual device or system or use of the device or system. Devices or systems as described herein may be used in a number of directions and orientations.

DETAILED DESCRIPTION

The present disclosure relates to permeable materials with a fluorine-free hydrophobic coating. The material may be superhydrophobic due to the hydrophobic coating. The hydrophobic permeable material may be used in various articles. Such articles may include a vent used in a vented cap.

In some cases, there is a need for permeable hydrophobic materials. Such materials, which may be permeable, for example, to gases such as air, may be hydrophobic and therefore not wettable by water. Such materials may be substantially impermeable to water.

According to an embodiment, an article includes a permeable material having a surface, and a hydrophobic coating on the surface forming a hydrophobic surface. The hydrophobic coating is free of a fluorine. Further, the entire article may be free of fluorine. The hydrophobic surface exhibits a water-contact angle of 120 degrees or greater. The permeable material may be a membrane having a first major surface and an opposing second major surface. The hydrophobic coating may be applied on the surface of the membrane. The hydrophobic coating may be applied throughout the membrane such that the hydrophobic coating coats the major surfaces, as well as minor surfaces, including surfaces or fibers and/or pores and cavities of the membrane.

According to an embodiment, a vent includes a permeable material having a surface. A hydrophobic coating is disposed on the permeable material forming a hydrophobic surface. The hydrophobic coating is free of fluorine. The hydrophobic surface exhibits a water-contact angle of 120 degrees or greater. The permeable material may be a membrane. The vent may be used in a vented cap. A vented cap includes a cap constructed for use on a container and the vent disposed within the cap. The vent may form a liquid-facing surface of the vented cap.

The permeability of a material may be measured by measuring its Frazier permeability as described in ASTM D737-18, using a Frazier Permeability Tester available from Frazier Precision Instrument Co. Inc., Gaithersburg, Maryland. The unit for Frazier permeability is 1 cfm/ft² at 0.5 inch water pressure drop, which is equivalent to 0.5 cm³/s/cm² at 125 Pa. Here, any Frazier permeability readings are given at 0.5 inch water pressure drop. A high porosity material generally has a high Frazier permeability and a low porosity material generally has a low Frazier permeability. A method for measuring pore size is described in ASTM D6767-21.

The hydrophobic coating may be used to coat any suitable permeable material. The permeable material may be selected to have a desired level of permeability. For example, the permeable material may have a pore size of at least about 0.05 μm and a Frazier permeability of 0.05 cfm/ft² at 0.5" water pressure drop (0.025 cm³/s/cm² at 125 Pa) or greater. The hydrophobic (coated) permeable material may exhibit a Frazier permeability of 0.1 cfm/ft² (0.051 cm³/s/cm² at 125 Pa) or greater, 0.2 cfm/ft² (0.10 cm³/s/cm² at 125 Pa) or greater, 0.4 cfm/ft² (0.20 cm³/s/cm² at 125 Pa) or greater, 0.5 cfm/ft² (0.25 cm³/s/cm² at 125 Pa) or greater, 0.6 cfm/ft² (0.30 cm³/s/cm² at 125 Pa) or greater, 0.7 cfm/ft² (0.36 cm³/s/cm² at 125 Pa) or greater, 0.8 cfm/ft² (0.41 cm³/s/cm² at 125 Pa) or greater, 0.9 cfm/ft² (0.46 cm³/s/cm² at 125 Pa) or greater, or 1 cfm/ft² (0.51 cm³/s/cm² at 125 Pa) or greater. While there is no desired upper limit on the permeability of the material, in practice, the Frazier permeability of the patterned material may be 3 cfm/ft² (1.52 cm³/s/cm² at 125 Pa) or lower, 2.5 cfm/ft² (1.27 cm³/s/cm² at 125 Pa) or lower, or 2 cfm/ft² (1.02 cm³/s/cm² at 125 Pa) or lower. The hydrophobic permeable material may have a permeability of at least 50%, at least 60%, at least 70%, or at least 80% of the permeability of the permeable material without the hydrophobic coating.

According to an embodiment, the permeable material is coated with a hydrophobic coating that is free of fluorine. When permeable materials with nanoscale or microscale surface structures are combined with a hydrophobic coating, high hydrophobicity, including superhydrophobicity, can be achieved without the use of fluorinated chemicals such as longer chain perfluoroalkyl substances (PFAS).

According to an embodiment, any suitable fluorine-free hydrophobic coating may be used. In some embodiments, the hydrophobic coating includes siloxanes, such as polyalkylsiloxanes. An example of a suitable polyalkylsiloxane includes polydimethylsiloxane (PDMS). In some embodiments, the hydrophobic coating includes an alkylated polymer, such as alkylated poly(meth)acrylate. Examples of suitable alkylated polymers include poly(hexyl methacrylate), poly(octyl methacrylate), and the like.

The hydrophobic permeable materials of the present disclosure are particularly suitable for applications where the material comes into contact with water or aqueous solutions. In some cases, the hydrophobic permeable material is used as a vent. Such vents may be used, for example, in packaging (e.g., in a vented cap) for aqueous solutions.

According to an embodiment, the hydrophobic permeable material has a hydrophobic surface that exhibits a water contact angle of 95 degrees or greater, 100 degrees or greater, 105 degrees or greater, 110 degrees or greater, 120 degrees or greater, 130 degrees or greater, 135 degrees or greater, 140 degrees or greater, 145 degrees or greater, or 150 degrees or greater. In some embodiments, the hydrophobic permeable material is superhydrophobic, having a water contact angle of 150 degrees or greater. In some embodiments, the hydrophobic permeable material has a water contact angle of 160 degrees or less, 150 degrees or less, 140 degrees or less, 130 degrees or less, 120 degrees or less, or 110 degrees or less.

According to an embodiment, the hydrophobic permeable material exhibits a desired roll-off angle when contacted with a water or an aqueous solution. Roll-off angle may be measured using a contact angle meter (e.g., a goniometer). The roll-off angle may be 20 degrees or lower, 15 degrees or lower, 10 degrees or lower, 8 degrees or lower, or 5 degrees or lower. The lowest possible roll-off angle may be desired. In practice, however, the roll-off angle may be 1 degree or greater, 2 degrees or greater, or 5 degrees or greater. The roll-off angle may be in a range of 1 degree to 20 degrees, 1 degree to 15 degrees, 1 degree to 10 degrees, or 1 degree to 5 degrees.

The properties of the hydrophobic surface may also be characterized by determining the wetted fraction of the surface when exposed to a liquid. The wetted fraction may be calculated from the contact angle as explained in the Examples below. According to an embodiment, the hydrophobic surface exhibits a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.4 or smaller, 0.3 or smaller, 0.25 or smaller, or 0.2 or smaller. The wetted fraction of the hydrophobic permeable material may be 0.05 or greater, 0.1 or greater, 0.2 or greater, 0.3 or greater, 0.5 or greater, 0.6 or greater, 0.7 or greater, 0.75 or greater, 0.8 or greater, 0.82 or greater, 0.84 or greater, or 0.86 or greater. The wetted fraction may be in a range of 0.05 to 0.5, 0.1 to 0.5, 0.1 to 0.4, 0.1 to 0.3, 0.1 to 0.2, 0.2 to 0.96, 0.2 to 0.95, 0.3 to 0.95, 0.4 to 0.95, 0.5 to 0.95, 0.6 to 0.95, 0.7 to 0.95, or 0.8 to 0.95.

Permeable materials that may be used to prepare the hydrophobic permeable materials of the present disclosure include, for example, membranes made of polypropylene, polyethylene, polyester, polysulfone, polyethersulfone (PES), polyamide (Nylon), polyacrylonitrile, polycarbonate, or cellulose acetate, and the like. In some embodiments, the permeable material is a membrane made of cellulose acetate or polyethersulfone (PES).

In some embodiments, the permeable material is made of polyethersulfone (PES), and be coated with polydimethylsiloxane (PDMS). The hydrophobic permeable material may be a polyethersulfone (PES) membrane coated with polydimethylsiloxane (PDMS). The membrane may be prepared by phase inversion. In some embodiments, the hydrophobic permeable material is a polyethersulfone (PES) membrane coated with polydimethylsiloxane (PDMS) and has a wetted fraction of 0.96 or smaller, 0.95 or smaller, 0.94 or smaller, 0.93 or smaller, or 0.92 or smaller. The wetted fraction of the hydrophobic permeable material may be 0.75 or greater, 0.8 or greater, 0.82 or greater, 0.84 or greater, or 0.86 or greater. The wetted fraction of the hydrophobic permeable material may be in a range of 0.8 to 0.96, 0.75 to 0.95, 0.80 to 0.95, 0.82 to 0.95, or 0.84 to 0.94. In some embodiments, the hydrophobic permeable material is a polyethersulfone (PES) membrane coated with polydimethylsiloxane (PDMS) and has a water contact angle of 95 degrees or greater, 100 degrees or greater, or 105 degrees or greater. The water contact angle of the hydrophobic permeable material may be 120 or lower, 115 or lower, or 110 or lower. The water contact angle of the hydrophobic permeable material may be in a range of 95 degrees to 120 degrees, 95 degrees to 115 degrees, or 100 degrees to 110 degrees.

The permeable material may include secondary structures, such as hierarchical structure, raised pattern features, or other structures. The secondary structures may be inherent in the material, or may be applied onto the material by imprinting, etching, or other methods. The secondary structures may extend throughout the material (including its surface) or may be disposed on the surface of the material. Such secondary structures may alter the properties of the surface in a variety of ways. For example, secondary structures can alter omniphobic surface properties (e.g., hydrophobicity, oleophobicity, etc.), adhesion (increased or decreased), anti-fouling behavior, and roll-off behavior of droplets. In some embodiments, the permeable material is a phase-inverted membrane.

In some embodiments, the permeable material is a membrane made of a phase-inverted cellulose acetate membrane. A phase-inverted cellulose acetate membrane may have nanometer-scale spheres, or nodules, on micrometer-scale fibers. In some embodiments, the permeable material is an expanded membrane or material. Examples expanded membranes and materials include expanded polyolefins, such as expanded polyethylene and expanded polypropylene. In some embodiments, the permeable material includes raised pattern features on its surface. Permeable materials with raised pattern features are described in PCT/US2022/023143 to Yoder et al.

According to an embodiment, a permeable material has an outer surface with a hierarchical pattern including a plurality of microscale features (e.g., nodules) and a plurality of raised macroscale features formed on the outer surface. The terms "microscale" and "macroscale" are used here to differentiate between features that differ in size by at least one order of magnitude, where microscale is understood to be smaller than macroscale. In this context, the terms "microscale" and "macroscale" are not necessarily indicative of any specific size range. The permeable material may further include intermediate features sized between the microscale and macroscale features, or features that are smaller or larger than either of the microscale and macroscale features. In some embodiments, the permeable material itself has a hierarchical structure, and another layer of hierarchy is added to the porous material by forming the raised macroscale features. For example, cellulose acetate may have nodules that are sized about 50 nm to 1000 nm and pores that are sized about 0.2 μm to 20 μm (or even up to 50 μm in some cases), and the raised structures formed on the cellulose acetate may be up to 60 μm in size.

The hydrophobic permeable material may be part of a composite material. Composite materials may be multi-layer materials. The hydrophobic permeable material may form the outer-most layer or layers of the composite material. The additional layer or layers of the composite material may also be permeable.

The hydrophobic coating may be applied onto the porous material by any suitable method. In some embodiments, the hydrophobic coating is applied onto the permeable material by dip coating or by chemical vapor deposition. The rate of application may be selected to achieve the desired hydrophobicity and/or roll-off angle. The rate of application may be selected to achieve a desired remaining permeability. In some embodiments, the hydrophobic permeable material includes 0.5 wt-% or more, 1 wt-% or more, 2 wt-% or more, 3 wt-% or more, 4 wt-% or more, or 5 wt-% or more, of the hydrophobic coating, based on total weight of the coated material. The hydrophobic coating may make up 10 wt-% or less, 9 wt-% or less, 8 wt-% or less, 7 wt-% or less, 6 wt-% or less, 5 wt-% or less, 4 wt-% or less, or 3 wt-% or less of the hydrophobic permeable material, based on total weight of the coated hydrophobic permeable material.

According to an embodiment, a method of making a hydrophobic article includes applying a hydrophobic material onto the permeable material and curing the hydrophobic material to form the hydrophobic surface. The hydrophobic material may be applied by dip coating the permeable material in a coating composition containing the hydrophobic material, or by chemical vapor deposition.

The hydrophobic material may be provided in a coating composition. The hydrophobic material may be applied in the form of an emulsion including the hydrophobic material. The emulsion may include the hydrophobic material in an aqueous carrier, and optionally one or more surfactants. Examples of suitable aqueous carriers include water and mixtures of water and an organic solvent, such as ethanol, isopropanol, butanol, and the like. Examples of suitable surfactants include alkylated acids, such as lauric acid, palmitic acid, and the like.

The concentration of the coating composition may affect the permeability of the coated material. In some embodiments, the concentration of the coating composition (e.g., emulsion) may be selected to reach a desired level of hydrophobicity and permeability. A higher concentration may result in an increased hydrophobicity but a reduced permeability. In some cases, the coating composition is applied at a concentration that maintains at least 50%, at least 60%, at least 70%, or at least 80% of the initial permeability of the underlying permeable material. Although in some embodiments some level of permeability may be traded for hydrophobicity, it is possible to reach water contact angles of 140 degrees or higher while maintaining 80% or more of the initial permeability by using the methods and materials of the present disclosure. The hydrophobic material may be included in the emulsion at a concentration of 6 w/v-% or less, 5 w/v-% or less, 4.5 w/v-% or less, 4 w/v-% or less, 3.5 w/v-% or less, 3 w/v-% or less, or 2.5 w/v-% or less. The hydrophobic material may be included in the emulsion at a concentration of 0.25 w/v-% or more, 0.5 w/v-% or more, 0.75 w/v-% or more, 1 w/v-% or more, 1.5 w/v-% or more, or 2 w/v-% or more. Exemplary concentration ranges of the hydrophobic material in the emulsion include 0.25 w/v-% to 6 w/v-%, 0.5 w/v-% to 5 w/v-%, 0.5 w/v-% to 4 w/v-%, 1 w/v-% to 4 w/v-%, and 1 w/v-% to 3 w/v-%.

Emulsions may be characterized by their droplet size (sometimes referred to as particle size). Droplet size of an emulsion may be measured by methods used for particle size measurement, such as dynamic light scattering. The emulsion may have a droplet size of 0.1 µm or greater, 0.2 µm or greater, 0.5 µm or greater, or 1 µm or greater. The emulsion may have a droplet size of 10 µm or less, 8 µm or less, or 5 µm or less. The droplet size may range from 0.1 µm to 10 µm, 0.1 µm to 8 µm, or from 0.2 µm to 5 µm.

The method of applying the hydrophobic coating may further include removing water or aqueous solvent from the coating composition (e.g., the emulsion) after applying the coating composition onto the surface. Water or aqueous solvent may be removed from the coating composition at an elevated temperature. For example, the temperature of the coating composition may be increased to 50° C. or greater, 75° C. or greater, 100° C. or greater, or 120° C. or greater. The temperature of the coating composition may be increased to up to 200° C., up to 175° C., or up to 150° C. The elevated temperature may be maintained for a suitable time period to remove water or aqueous solvent from the coating composition. For example, the elevated temperature may be maintained for 1 min or longer, 2 min or longer, 3 min or longer, 4 min or longer, or 5 min or longer. The elevated temperature may be maintained for 30 min or less, 20 min or less, 15 min or less, or 10 min or less. Further, curing of the hydrophobic material may occur during or after the removing of water.

The curing of the hydrophobic material may include crosslinking the hydrophobic material. In some cases, the hydrophobic material may be self-crosslinking. However, in many cases, the coating composition (e.g., emulsion) includes a crosslinking agent. Examples of suitable crosslinking agents include tetramethyl orthosilicate, tetraethyl orthosilicate, and acid catalysts (suitable for crosslinking via condensation); and Pt catalysts for crosslinking via vinyl groups (if any) present in the hydrophobic material. The crosslinking agent may be included at any suitable concentration, depending on the chemistry of the crosslinking agent and the hydrophobic material, as well as the desired degree of crosslinking. The curing of the hydrophobic material may occur at an elevated temperature. The specific temperature may be selected based on the chemistry of the hydrophobic material and optional crosslinking agent. Some materials may be cured at lower temperatures, such as from 25° C. to 50° C. Other materials may benefit from a higher temperature, such as 50° C. or greater, 75° C. or greater, 100° C. or greater, 120° C. or greater, or 140° C. or greater. The curing temperature is preferably below any temperature that would cause thermal degradation of either the hydrophobic material or the underlying permeable material. For example, the hydrophobic material may be cured (e.g., crosslinked) at temperatures below 250° C., below 225° C., below 200° C., or below 175° C.

The hydrophobic coating prepared by the method results in a hydrophobic surface that exhibits a water contact angle of 95 degrees or greater, 100 degrees or greater, 105 degrees or greater, 110 degrees or greater, 120 degrees or greater, 130 degrees or greater, 135 degrees or greater, 140 degrees or greater, 145 degrees or greater, or 150 degrees or greater. The hydrophobic coating prepared by the method results in a hydrophobic surface that exhibits a roll-off angle of 20 degrees or lower, 15 degrees or lower, 10 degrees or lower, 8 degrees or lower, or 5 degrees or lower. The lowest possible roll-off angle may be desired. In practice, however, the roll-off angle may be 1 degree or greater, 2 degrees or greater, or 5 degrees or greater. The roll-off angle may be in a range of 1 degree to 20 degrees, 1 degree to 15 degrees, 1 degree to 10 degrees, or 1 degree to 5 degrees.

The application of the hydrophobic material according to the methods described herein may result in the formation of a conformal hydrophobic coating on the permeable material. The conformal hydrophobic coating exhibits hydrophobicity that is due to the hydrophobic character of the hydrophobic material. The conformal hydrophobic coating may also exhibit increased hydrophobicity that is due to the surface structure of the underlying permeable material. Such increased hydrophobicity may be achieved, in particular, with permeable materials that have secondary structures or hierarchical structures (e.g., microscale features, such as nodules) on their surfaces. Examples of such materials include phase-inverted membranes, as discussed elsewhere herein. The conformal hydrophobic coating may render materials with secondary structures hydrophobic and even superhydrophobic, even when the underlying material may itself be hydrophilic.

According to embodiments, the hydrophobic surface of the hydrophobic material made by the methods of the present disclosure is free of fluorine. The hydrophobic material may further be made into suitable articles. One example of an article made from the hydrophobic material is a vent, such as a vent on a bottle cap. A vent made from the hydrophobic material exhibits water resistance while being free of fluorine and while allowing venting of gases from the container (e.g., bottle). The vent made from the hydrophobic material may also exhibit a desirable level of chemical resistance and may be used in bottle caps for chemical storage bottles.

Referring now to FIG. 1A, an SEM image of an exemplary hydrophobic permeable material 1 is shown. The permeable material in the exemplary hydrophobic permeable material 1 is a phase-inverted cellulose acetate membrane 10. A portion of the hydrophobic permeable material 1 is schematically shown in FIG. 1B. The hydrophobic coating 11 forms a conformal coating on the cellulose acetate membrane 10. That is, the cellulose acetate membrane 10 is coated with hydrophobic coating 11 on all sides, including around fibrous portions and inside pores and cavities.

FIG. 2 schematically illustrates an exemplary container 30 (e.g., bottle) and a cap 20 configured to close an opening 31 of the container 30. The cap 20 is a vented cap and includes a vent 21 made of the hydrophobic porous material according to embodiments of the present disclosure.

ILLUSTRATIVE EMBODIMENTS

The technology described herein is defined in the claims. However, below is provided a non-exhaustive listing of non-limiting embodiments. Any one or more of the features of these embodiments may be combined with any one or more features of another example, embodiment, or aspect described herein.

Embodiment 1 is an article comprising:

a permeable material having a surface; and a hydrophobic coating on the surface forming a hydrophobic surface, the hydrophobic coating being free of fluorine, and the hydrophobic surface having a water-contact angle of 95 degrees or greater.

Embodiment 2 is the article of embodiment 1, wherein the hydrophobic surface has a water contact angle of 100 degrees or greater, 105 degrees or greater, 110 degrees or greater, 120 degrees or greater, 130 degrees or greater, 135 degrees or greater, 140 degrees or greater, 145 degrees or greater, or 150 degrees or greater. The hydrophobic surface may have a water contact angle of 160 degrees or less, 150 degrees or less, 140 degrees or less, 130 degrees or less, 120 degrees or less, 110 degrees or less.

Embodiment 3 is the article of embodiment 1 or 2, wherein the hydrophobic surface exhibits a roll-off angle of 20 degrees or lower, 15 degrees or lower, 10 degrees or lower, 8 degrees or lower, or 5 degrees or lower.

Embodiment 4 is the article any one of embodiments 1 to 3, wherein the hydrophobic surface exhibits a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.45 or smaller, or 0.4 or smaller in contact with a liquid having a surface tension of 35 mN/m or greater. The hydrophobic surface may exhibit a wetted fraction of 0.05 or greater, 0.1 or greater, 0.2 or greater, 0.3 or greater, 0.4 or greater, 0.5 or greater, 0.6 or greater, 0.7 or greater, or 0.8 or greater.

Embodiment 5 is the article any one of embodiments 1 to 4, wherein the hydrophobic surface exhibits a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.4 or smaller, 0.35 or smaller 0.3 or smaller, 0.25 or smaller, or 0.2 or smaller in contact with a liquid having a surface tension of 40 mN/m or greater. The hydrophobic surface may exhibit a wetted fraction of 0.05 or greater, 0.1 or greater, 0.2 or greater, 0.3 or greater, 0.4 or greater, 0.5 or greater, 0.6 or greater, 0.7 or greater, 0.75 or greater, or 0.8 or greater.

Embodiment 6 is the article any one of embodiments 1 to 5, wherein the permeable material comprises a phase-inverted membrane.

Embodiment 7 is the article any one of embodiments 1 to 6, wherein the surface exhibits a nodular secondary structure.

Embodiment 8 is the article any one of embodiments 1 to 7, wherein the permeable material comprises cellulose acetate, PES, or a combination thereof.

Embodiment 9 is the article any one of embodiments 1 to 8, wherein the hydrophobic coating is crosslinked.

Embodiment 10 is the article any one of embodiments 1 to 9, wherein the hydrophobic coating comprises siloxane, optionally wherein the hydrophobic coating comprises poly-alkylsiloxane, further optionally wherein the hydrophobic coating comprises polydimethylsiloxane.

Embodiment 11 is the article any one of embodiments 1 to 10, wherein the hydrophobic coating comprises an alky-lated polymer, such as poly(hexyl methacrylate), poly(octyl methacrylate), or a combination thereof.

Embodiment 12 is the article any one of embodiments 1 to 11, wherein the hydrophobic coating is applied onto the permeable material by dip coating or chemical vapor deposition.

Embodiment 13 is the article any one of embodiments 1 to 12, wherein the article is free of fluorine.

Embodiment 14 is a permeable membrane comprising:

a permeable material having a surface; and a hydrophobic coating on the surface forming a hydrophobic surface, the hydrophobic coating being free of fluorine, and the hydrophobic surface having a water-contact angle of 95 degrees or greater.

Embodiment 15 is a permeable membrane comprising:

a permeable material having a surface; and a hydrophobic coating on the surface forming a hydrophobic surface, the hydrophobic coating being free of fluorine, and the hydrophobic surface exhibiting a wetted fraction of 0.5 or less with a liquid having a surface tension of 35 mN/m or greater.

Embodiment 16 is the permeable membrane of embodiment 14 or 15, wherein the hydrophobic surface has a water contact angle of 100 degrees or greater, 105 degrees or greater, 110 degrees or greater, 120 degrees or greater, 130 degrees or greater, 135 degrees or greater, 140 degrees or greater, 145 degrees or greater, or 150 degrees or greater. The hydrophobic surface may have a water contact angle of 160 degrees or less, 150 degrees or less, 140 degrees or less, 130 degrees or less, 120 degrees or less, or 110 degrees or less.

Embodiment 17 is the permeable membrane any one of embodiments 14 to 16, wherein the hydrophobic surface exhibits a roll-off angle of 20 degrees or lower, 15 degrees or lower, 10 degrees or lower, 8 degrees or lower, or 5 degrees or lower.

Embodiment 18 is the permeable membrane any one of embodiments 14 to 17, wherein the hydrophobic surface exhibits a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.45 or smaller, or 0.4 or smaller in contact with a liquid having a surface tension of 35 mN/m or greater. The hydrophobic surface may exhibit a wetted fraction of 0.05 or greater, 0.1 or greater, 0.2 or greater, 0.3 or greater, 0.4 or greater, 0.5 or greater, 0.6 or greater, 0.7 or greater, 0.75 or greater, or 0.8 or greater.

Embodiment 19 is the permeable membrane any one of embodiments 14 to 18, wherein the hydrophobic surface exhibits a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.4 or smaller, 0.35 or smaller 0.3 or smaller, 0.25 or smaller, or 0.2 or smaller in contact with a liquid having a surface tension of 40 mN/m or greater. The hydrophobic surface may exhibit a wetted fraction of 0.05 or greater, 0.1 or greater, 0.2 or greater, 0.3 or greater, 0.4 or greater, 0.5 or greater, 0.6 or greater, 0.7 or greater, 0.75 or greater, or 0.8 or greater.

Embodiment 20 is the permeable membrane any one of embodiments 14 to 19, wherein the permeable material comprises a phase-inverted membrane.

Embodiment 21 is the permeable membrane any one of embodiments 14 to 20, wherein the surface exhibits a nodular secondary structure.

Embodiment 22 is the permeable membrane any one of embodiments 14 to 21, wherein the permeable material comprises cellulose acetate, PES, or a combination thereof.

Embodiment 23 is the permeable membrane any one of embodiments 14 to 22, wherein the hydrophobic coating is crosslinked.

Embodiment 24 is the permeable membrane any one of embodiments 14 to 23, wherein the hydrophobic coating comprises siloxane, optionally wherein the hydrophobic coating comprises polyalkylsiloxane, further optionally wherein the hydrophobic coating comprises polydimethylsiloxane.

Embodiment 25 is the permeable membrane any one of embodiments 14 to 24, wherein the hydrophobic coating comprises an alkylated polymer, such as poly(hexyl methacrylate), poly(octyl methacrylate), or a combination thereof.

Embodiment 26 is the permeable membrane any one of embodiments 14 to 25, wherein the hydrophobic coating is applied onto the permeable material by dip coating or chemical vapor deposition.

Embodiment 27 is the permeable membrane any one of embodiments 14 to 26, wherein the permeable membrane is free of fluorine.

Embodiment 28 is a vent comprising:

a permeable material having a surface; and a hydrophobic coating on the surface forming a hydrophobic surface, the hydrophobic coating being free of fluorine, and the hydrophobic surface having a water-contact angle of 95 degrees or greater.

Embodiment 29 is the vent of embodiment 28, wherein the hydrophobic surface has a water contact angle of 100 degrees or greater, 105 degrees or greater, 110 degrees or greater, 120 degrees or greater, 130 degrees or greater, 135 degrees or greater, 140 degrees or greater, 145 degrees or greater, or 150 degrees or greater. The hydrophobic surface may have a water contact angle of 160 degrees or less, 150 degrees or less, 140 degrees or less, 130 degrees or less, 120 degrees or less, or 110 degrees or less.

Embodiment 30 is the vent of embodiment 28 or 29, wherein the hydrophobic surface exhibits a roll-off angle of 20 degrees or lower, 15 degrees or lower, 10 degrees or lower, 8 degrees or lower, or 5 degrees or lower.

Embodiment 31 is the vent any one of embodiments 28 to 30, wherein the hydrophobic surface exhibits a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.45 of smaller, or 0.4 or smaller in contact with a liquid having a surface tension of 35 mN/m or greater. The hydrophobic surface may exhibit a wetted fraction of 0.05 or greater, 0.1 or greater, 0.2 or greater, 0.3 or greater, 0.4 or greater, 0.5 or greater, 0.6 or greater, 0.7 or greater, 0.75 or greater, or 0.8 or greater.

Embodiment 32 is the vent any one of embodiments 28 to 31, wherein the hydrophobic surface exhibits a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.4 or smaller, 0.35 or smaller 0.3 or smaller, 0.25 or smaller, or 0.2 or smaller in contact with a liquid having a surface tension of 40 mN/m or greater. The hydrophobic surface may exhibit a wetted fraction of 0.05 or greater, 0.1 or greater, 0.2 or greater, 0.3 or greater, 0.4 or greater, 0.5 or greater, 0.6 or greater, 0.7 or greater, 0.75 or greater, or 0.8 or greater. Embodiment 33 is the vent any one of embodiments 28 to 32, wherein the permeable material comprises a phase-inverted membrane.

Embodiment 34 is the vent any one of embodiments 28 to 33, wherein the surface exhibits a nodular secondary structure.

Embodiment 35 is the vent any one of embodiments 28 to 34, wherein the permeable material comprises cellulose acetate, PES, or a combination thereof.

Embodiment 36 is the vent any one of embodiments 28 to 35, wherein the hydrophobic coating is crosslinked.

Embodiment 37 is the vent any one of embodiments 28 to 36, wherein the hydrophobic coating comprises siloxane, optionally wherein the hydrophobic coating comprises polyalkylsiloxane, further optionally wherein the hydrophobic coating comprises polydimethylsiloxane.

Embodiment 38 is the vent any one of embodiments 28 to 37, wherein the hydrophobic coating comprises an alkylated polymer, such as poly(hexyl methacrylate), poly(octyl methacrylate), or a combination thereof.

Embodiment 39 is the vent any one of embodiments 28 to 38, wherein the hydrophobic coating is applied onto the permeable material by dip coating or chemical vapor deposition.

Embodiment 40 is the vent any one of embodiments 28 to 39, wherein the vent is free of fluorine.

Embodiment 41 is a vented cap comprising:

a cap constructed for use on a container; and a vent disposed within the cap, the vent comprising:

a permeable material having a surface;

a hydrophobic coating on the surface forming a hydrophobic surface, the hydrophobic coating being free of fluorine, and the hydrophobic surface having a water-contact angle of 95 degrees or greater.

Embodiment 42 is the vented cap of embodiment 41, wherein the hydrophobic surface has a water contact angle of 100 degrees or greater, 105 degrees or greater, 110 degrees or greater, 120 degrees or greater, 130 degrees or greater, 135 degrees or greater, 140 degrees or greater, 145 degrees or greater, or 150 degrees or greater. The hydrophobic surface may have a water contact angle of 160 degrees or less, 150 degrees or less, 140 degrees or less, 130 degrees or less, 120 degrees or less, or 110 degrees or less.

Embodiment 43 is the vented cap of embodiment 41 or 42, wherein the hydrophobic surface exhibits a roll-off angle of 20 degrees or lower, 15 degrees or lower, 10 degrees or lower, 8 degrees or lower, or 5 degrees or lower.

Embodiment 44 is the vented cap any one of embodiments 41 to 43, wherein the hydrophobic surface exhibits a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.45 of smaller, or 0.4 or smaller in contact with a liquid having a surface tension of 35 mN/m or greater. The hydrophobic surface may exhibit a wetted fraction of 0.05 or greater, 0.1 or greater, 0.2 or greater, 0.3 or greater, 0.4 or greater, 0.5 or greater, 0.6 or greater, 0.7 or greater, 0.75 or greater, or 0.8 or greater.

Embodiment 45 is the vented cap any one of embodiments 41 to 44, wherein the hydrophobic surface exhibits a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.4 or smaller, 0.35 or smaller 0.3 or smaller, 0.25 or smaller, or 0.2 or smaller in contact with a liquid having a surface tension of 40 mN/m or greater. The hydrophobic surface may exhibit a wetted fraction of 0.05 or greater, 0.1 or greater, 0.2 or greater, 0.3 or greater, 0.4 or greater, 0.5 or greater, 0.6 or greater, 0.7 or greater, 0.75 or greater, or 0.8 or greater.

Embodiment 46 is the vented cap any one of embodiments 41 to 45, wherein the permeable material comprises a phase-inverted membrane.

Embodiment 47 is the vented cap any one of embodiments 41 to 46, wherein the surface exhibits a nodular secondary structure.

Embodiment 48 is the vented cap any one of embodiments 41 to 47, wherein the permeable material comprises cellulose acetate, PES, or a combination thereof.

Embodiment 49 is the vented cap any one of embodiments 41 to 48, wherein the hydrophobic coating is cross-linked.

Embodiment 50 is the vented cap any one of embodiments 41 to 49, wherein the hydrophobic coating comprises siloxane, optionally wherein the hydrophobic coating comprises polyalkylsiloxane, further optionally wherein the hydrophobic coating comprises polydimethylsiloxane.

Embodiment 51 is the vented cap any one of embodiments 41 to 50, wherein the hydrophobic coating comprises an alkylated polymer, such as poly(hexyl methacrylate), poly(octyl methacrylate), or a combination thereof.

Embodiment 52 is the vented cap any one of embodiments 41 to 51, wherein the hydrophobic coating is applied onto the permeable material by dip coating or chemical vapor deposition.

Embodiment 53 is the vented cap any one of embodiments 41 to 52, wherein the vent is free of fluorine.

Embodiment 54 is a method of making a hydrophobic article, the method comprising:

applying a hydrophobic material onto a permeable material; and curing the hydrophobic material to form a hydrophobic surface, the hydrophobic material being free of fluorine, and the hydrophobic surface having a water-contact angle of 95 degrees or greater.

Embodiment 55 is the method of embodiment 54, wherein the hydrophobic material is applied by dip coating or chemical vapor deposition.

Embodiment 56 is the method of embodiment 54 or 55, wherein the hydrophobic material is applied in the form of an emulsion comprising the hydrophobic material.

Embodiment 57 is the method any one of embodiments 54 to 56, wherein the emulsion comprises an aqueous carrier and optionally one or more surfactants.

Embodiment 58 is the method any one of embodiments 54 to 57, wherein the curing of the hydrophobic material comprises crosslinking the hydrophobic material.

Embodiment 59 is the method any one of embodiments 54 to 58, further comprising removing water from the hydrophobic material after applying the hydrophobic material onto the surface, optionally wherein removing water is performed at an elevated temperature.

Embodiment 60 is the method any one of embodiments 54 to 59, wherein the curing occurs during or after the removing of water.

Embodiment 61 is the method any one of embodiments 54 to 60, wherein the hydrophobic material comprises siloxane, optionally wherein the hydrophobic coating comprises polyalkylsiloxane, further optionally wherein the hydrophobic coating comprises polydimethylsiloxane.

Embodiment 62 is the method any one of embodiments 54 to 61, wherein the hydrophobic material comprises an alkylated polymer, such as poly(hexyl methacrylate), poly(octyl methacrylate), or a combination thereof.

Embodiment 63 is the method any one of embodiments 54 to 62, wherein the hydrophobic surface has a water contact angle of 100 degrees or greater, 105 degrees or greater, 110 degrees or greater, 120 degrees or greater, 130 degrees or greater, 135 degrees or greater, 140 degrees or greater, 145 degrees or greater, or 150 degrees or greater. The hydrophobic surface may have a water contact angle of 160 degrees or less, 150 degrees or less, 140 degrees or less, 130 degrees or less, 120 degrees or less, or 110 degrees or less.

Embodiment 64 is the method any one of embodiments 54 to 63, wherein the hydrophobic surface exhibits a roll-off angle of 20 degrees or lower, 15 degrees or lower, 10 degrees or lower, 8 degrees or lower, or 5 degrees or lower.

Embodiment 65 is the method any one of embodiments 54 to 64, wherein the hydrophobic surface exhibits a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.45 of smaller, or 0.4 or smaller in contact with a liquid having a surface tension of 35 mN/m or greater. The hydrophobic surface may exhibit a wetted fraction of 0.05 or greater, 0.1 or greater, 0.2 or greater, 0.3 or greater, 0.4 or greater, 0.5 or greater, 0.6 or greater, 0.7 or greater, 0.75 or greater, or 0.8 or greater.

Embodiment 66 is the method any one of embodiments 54 to 65, wherein the hydrophobic surface exhibits a wetted fraction of 0.96 or smaller, 0.95 or smaller, 0.94 or smaller, 0.93 or smaller, 0.92 or smaller, 0.91 or smaller, 0.9 or smaller, 0.8 or smaller, 0.7 or smaller, 0.6 or smaller, 0.5 or smaller, 0.4 or smaller, 0.35 or smaller 0.3 or smaller, 0.25 or smaller, or 0.2 or smaller in contact with a liquid having a surface tension of 40 mN/m or greater. The hydrophobic surface may exhibit a wetted fraction of 0.05 or greater, 0.1 or greater, 0.2 or greater, 0.3 or greater, 0.4 or greater, 0.5 or greater, 0.6 or greater, 0.7 or greater, 0.75 or greater, or 0.8 or greater. Embodiment 67 is the method any one of embodiments 54 to 66, wherein the permeable material comprises a phase-inverted membrane.

Embodiment 68 is the method any one of embodiments 54 to 67, wherein the surfaces exhibit a nodular secondary structure.

Embodiment 69 is the method any one of embodiments 54 to 68, wherein the permeable material comprises cellulose acetate, PES, or a combination thereof.

Embodiment 70 is the method any one of embodiments 54 to 69, wherein prior to application of the hydrophobic material onto the permeable material, the permeable material has an initial permeability and after application of the hydrophobic material onto the permeable material, the permeable material has a final permeability, wherein the final permeability is at least 50%, at least 60%, at least 70%, or at least 80% of the initial permeability.

Embodiment 71 is the method any one of embodiments 54 to 70, wherein the hydrophobic article comprises a membrane.

Embodiment 72 is the method any one of embodiments 54 to 71, wherein the hydrophobic article comprises a vent.

EXAMPLES

Media prepared from various materials including cellulose acetate (CA), expanded PTFE (ePTFE), polyethersulfone (PES), and commercially available composite media (SYNTEQ XP™) were coated using the methods of the present disclosure.

The coated materials (Media samples A-J) with their nominal pore sizes are shown in TABLE 1A below:

TABLE 1A

| Sample | Material | Source |
|---|---|---|
| Media A | 0.45 μm CA | Sterlitech Corporation in Auburn, WA |
| Media B | 1.2 μm CA | Sterlitech Corporation |
| Media C | 0.2 μm PES | Laboratory prepared by phase inversion |
| Media D | 0.6 μm PES | Laboratory prepared by phase inversion |
| Media E | ePTFE Monoaxially stretched | Donaldson Company, Inc. in Bloomington, MN |
| Media F | ePTFE Biaxially stretched w/scrim | Donaldson Company, Inc. |
| Media G | Wetlaid 3 μm SYNTEQ XP ™ | Donaldson Company, Inc. |
| Media H | 0.2 μm CA | Sterlitech Corporation |
| Media I | 0.8 μm CA | Sterlitech Corporation |
| Media J | 5 μm CA | Sterlitech Corporation |

The coatings were made with various commercially available polydimethylsiloxane (PDMS) coating materials, and a comparative coating was made with a fluorinated C6 polymer, as detailed in TABLE 1B below:

TABLE 1B

| Sample | Coating Type | Material | Source |
|---|---|---|---|
| Coating 1 | PDMS emulsion | UNIDYNE 5005 | Daikin Industries, Ltd. in Osaka, Japan |
| Coating 2 | PDMS emulsion | ZELAN ™ R3 | DuPont in Johnston, IA |
| Coating 3 | Comparative, fluorinated coating | C6 Polymer 100LCF | Cytonix LLC in Beltsville, MD |
| Coating 4 | PDMS emulsion | ICM EM 10000 | CHT Group in Tubingen, Germany |
| Coating 5 | PDMS emulsion | ICM EM 1000SP | CHT Group |
| Coating 6 | PDMS emulsion | ICM EM 1670 | CHT Group |
| Coating 7 | PDMS emulsion | DOWSIL ™ 6683 | Dow Inc. in Midland, MI |
| Coating 8 | PDMS emulsion | JVA | Huntsman |

Coating the Media Samples

Concentrated emulsions of the coatings were diluted with distilled water (18.3 MOhm) to 3% (w/v). Comparative coating 3 was dissolved in Novec 7100 solvent. The diluted coating materials were then placed in petri dishes (about 4" in diameter and 0.5" deep). The media samples to be coated were no more than 90 mm in diameter. Holding with tweezers, the media was pulled down into the emulsion from one side of the petri dish to the other before being removed from the emulsion. Excess emulsion was allowed to drain as the media was held vertically. The media was placed between two square aluminum frames (3"×4") clamped together with a paper binder. This was then placed in an oven at 150 degrees C. for 5 min to dry/cure. Before any testing, the media was removed from the frame. Only the portions of the media that were not in contact with the frame were used for testing.

Figure 3A:
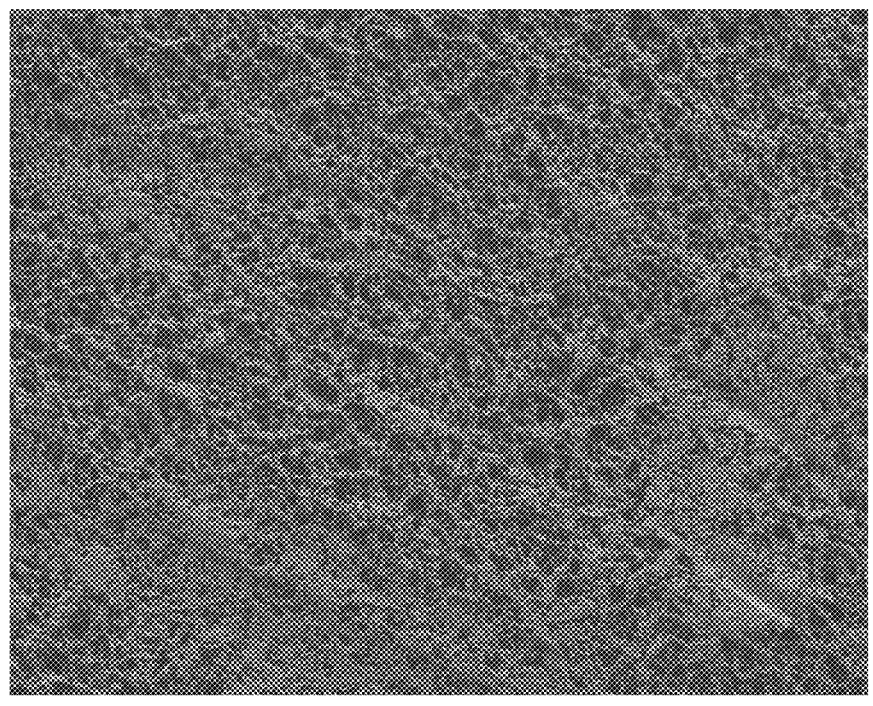
FIGS. 3A-3F are SEM images of coated media according to the Examples.
Figure 3B:
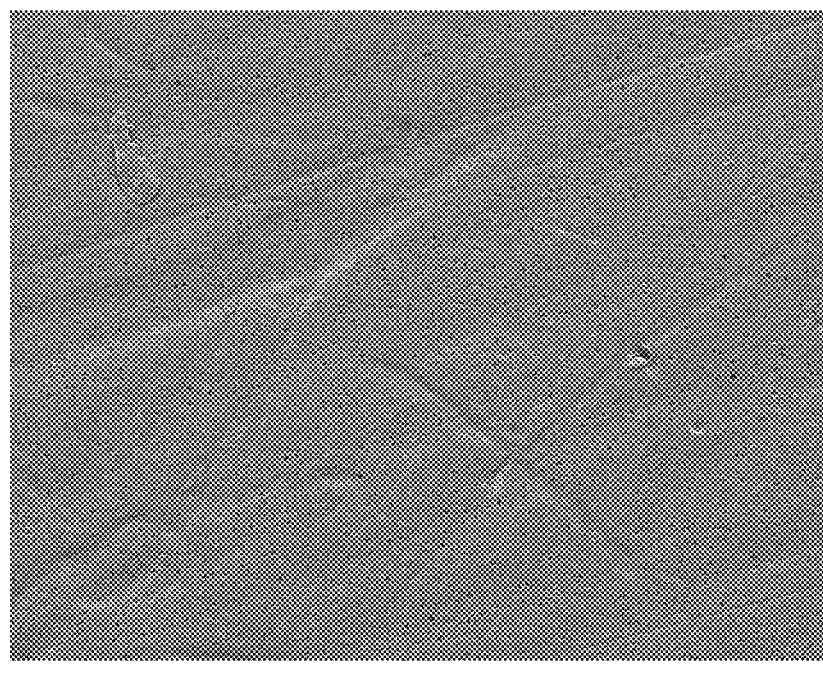
Figure 3C:
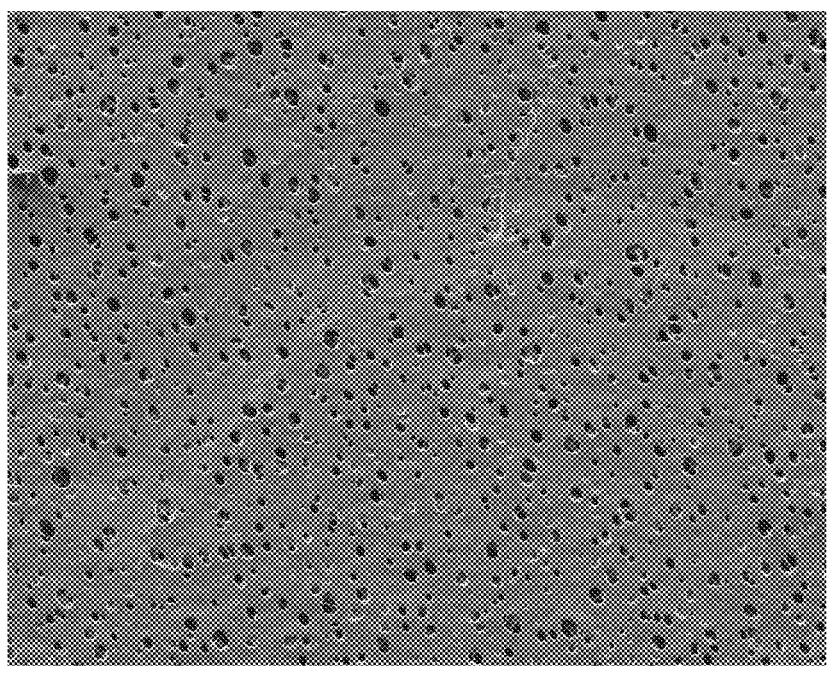
Figure 3D:
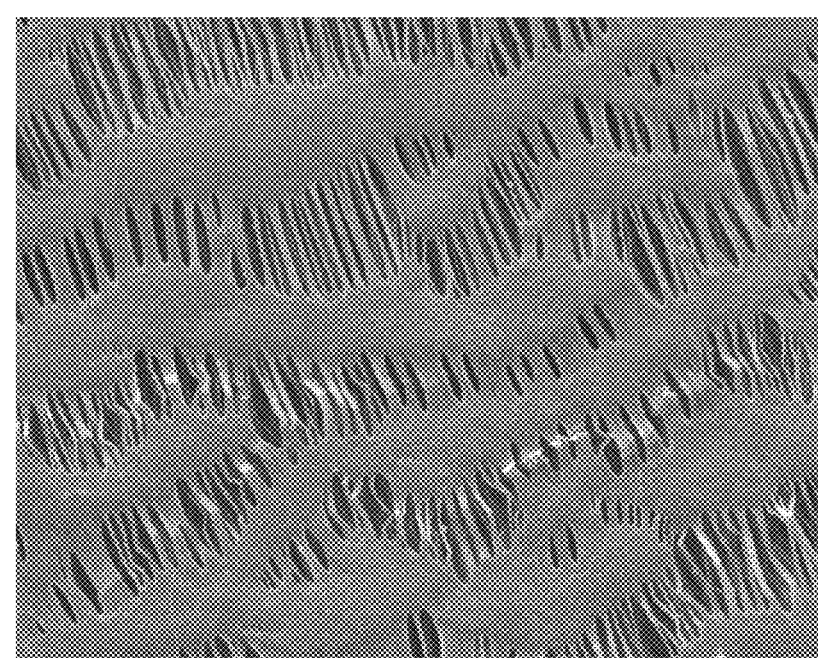
Figure 3E:
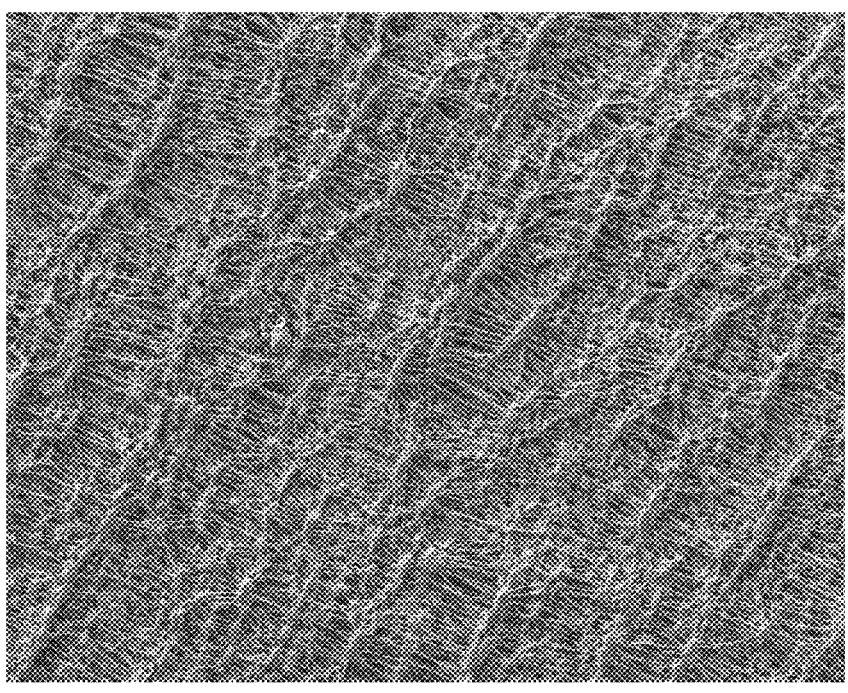
Figure 3F:

Scanning electron microscope (SEM) images of some of the coated samples are shown in FIGS. 3A (Media B with Coating 8); 3B (Media C with Coating 1); 3C (Media D with Coating 1); 3D (Media E with Coating 3); 3E (Media F with Coating 3); and 3F (Media G with Coating 1).

The increase in weight of Media A and B due to coating with Coating 1 and 2 was also determined. The coating weight is shown in TABLE 1C below.

TABLE 1C

| | Total weight pickup of emulsion (3% w/v) | | | | | | Calculated Coating | |
| | Coating 1 | | | Coating 2 | | | as % of Total Media | |
| | Before | After | Difference | Before | After | Difference | Weight | |
| | (g) | (g) | (g) | (g) | (g) | (g) | Coating 1 | Coating 2 |
|---|---|---|---|---|---|---|---|---|
| Media A | 0.2718 | 0.7961 | 0.5243 | 0.27811 | 0.865 | 0.5869 | 1.98% | 2.04% |
| Media B | 0.2746 | 0.861 | 0.5864 | 0.2765 | 0.807 | 0.5305 | 2.04% | 1.97% |

Example 1

The contact angle and wetted fraction of Media A-G, coated with Coatings 1-3, was determined.

Contact Angle Measurement

The contact angle of test fluids having various known surface tension levels was measured as described below (the test method reflects ASTM D2578). DI water (18.2 MOhm) was used for testing at surface tension 72 mN/m. For all other surface tensions, ACCUDYNE TEST™ surface tension test fluids were used and formulated per ASTM D2578 from 100% reagent grade materials.

Five 10 µL droplets of liquid with known surface tension were gently placed on the coated media sample. The contact angle was measured using a DROPMASTER DM-701 contact angle meter equipped with a tilt stage (available from Kyowa Interface Science Co., Ltd. in Niiza-City, Japan). The surface tension of each of the five droplets was measured and the average was reported.

The wetted fraction was calculated from the contact angle θ (theta) using Equation 1:

$$\cos\theta_m = x_1\cos\theta_{y_1} + x_2\cos\theta_{y_2}, \qquad \text{Equation 1}$$

where x is the area fraction characterized by a given chemistry and subscripts 1 and 2 indicate two different surface chemistries. Since the second area is air and the contact angle against liquid and air can be considered to be 180°, Equation 1 can be simplified to Equation 2. Rearrangement of Equation 2 to solve for x yields Equation 3 and was used to calculate the wetted fraction.

$$\cos\theta_m = x_1\left(\cos\theta_{y_1} + 1\right) - 1, \qquad \text{Equation 2}$$

$$\frac{\cos\theta_m + 1}{\cos\theta_{y_1} + 1} = x_1. \qquad \text{Equation 3}$$

Values of x larger than 1 are not considered valid and not shown on any plots (maximum Y range of 1.0).

Figure 4A:
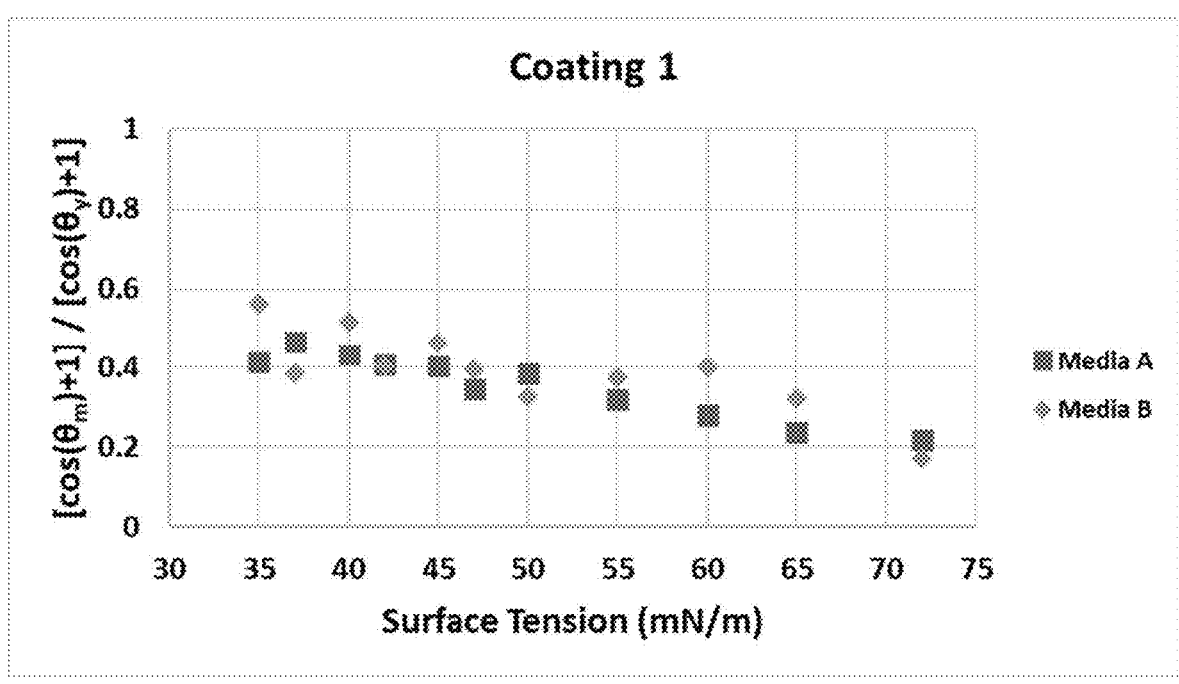
FIGS. 4A-4C, 5A-5C, 6A-6C, and 7 are graphical representations of data from Example 1.
Figure 4B:
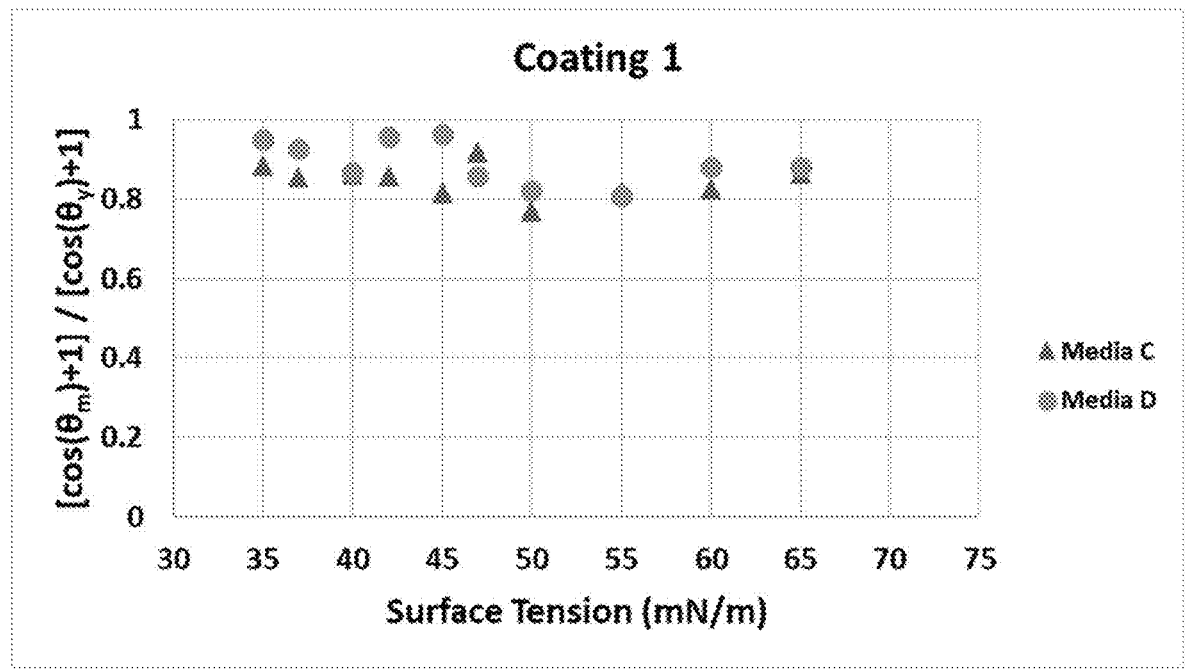
Figure 4C:
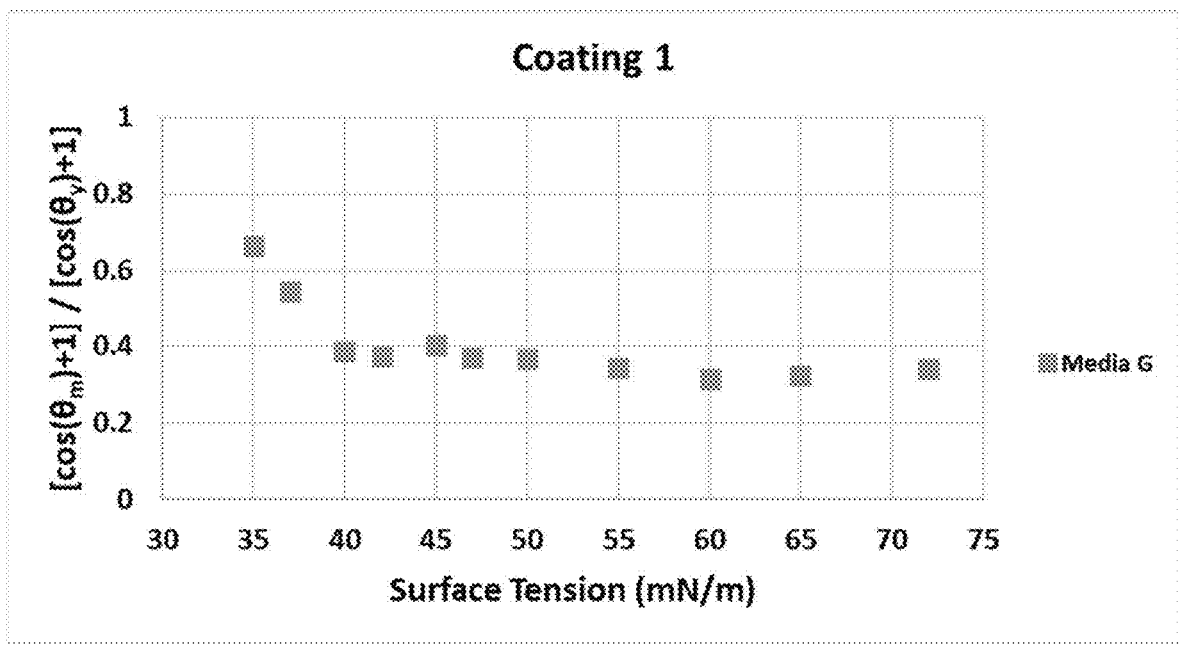
Figure 5A:
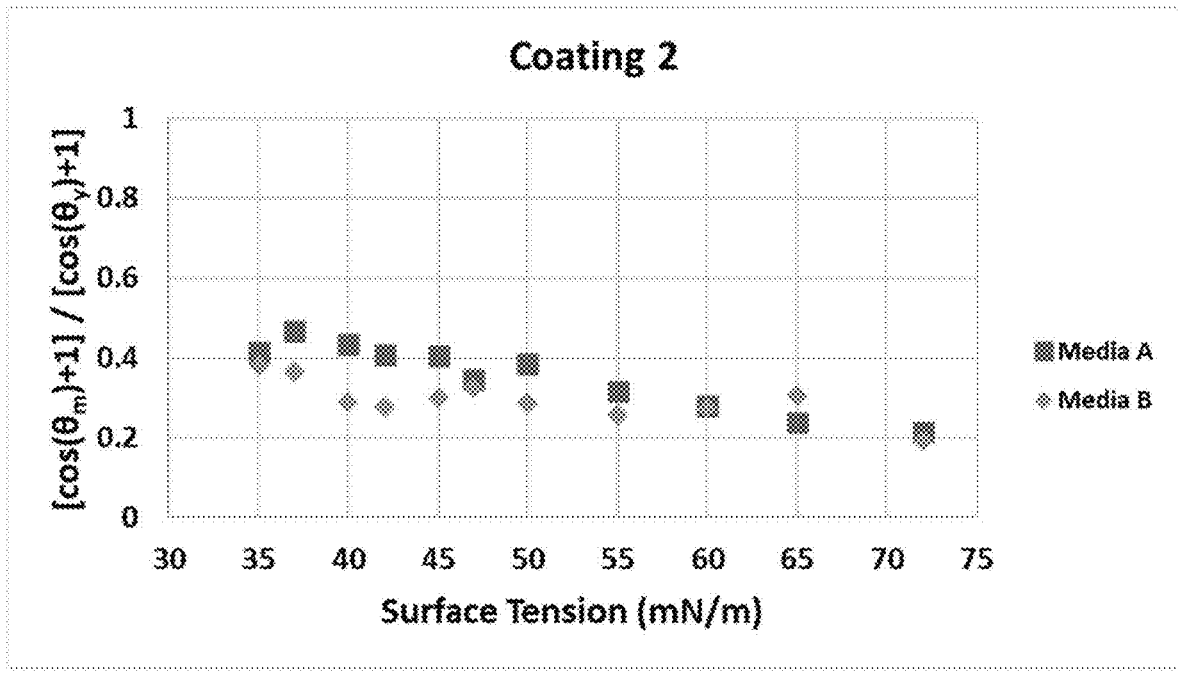
Figure 5B:
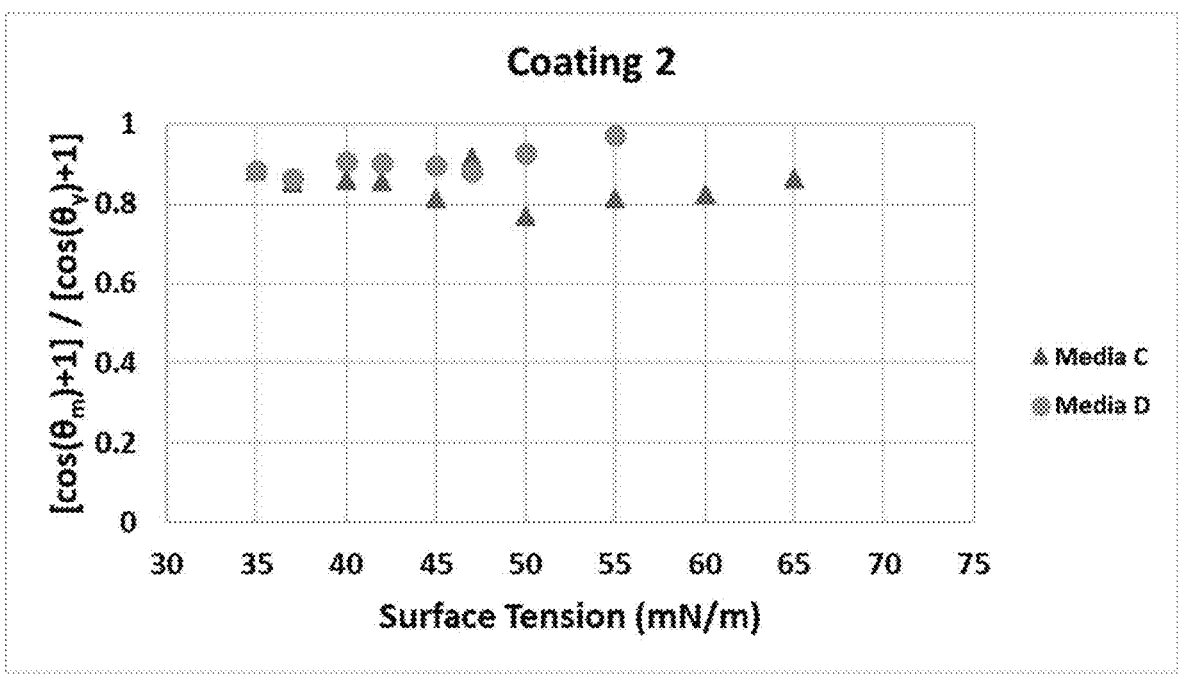
Figure 5C:
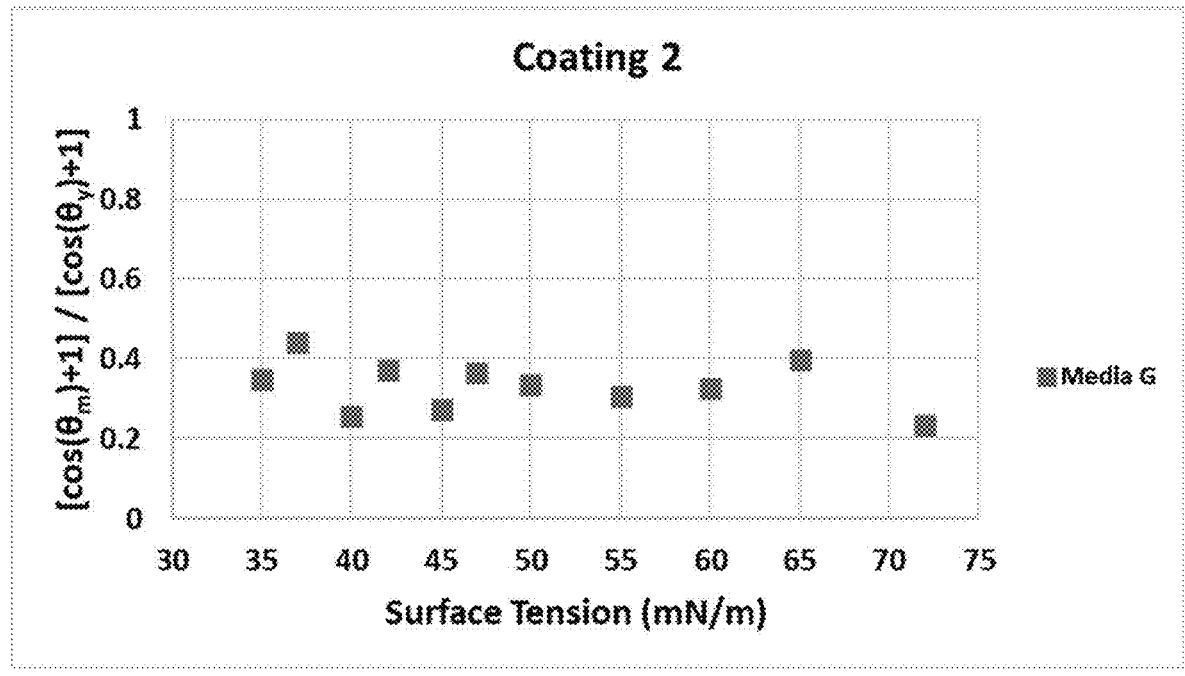
Figure 6A:
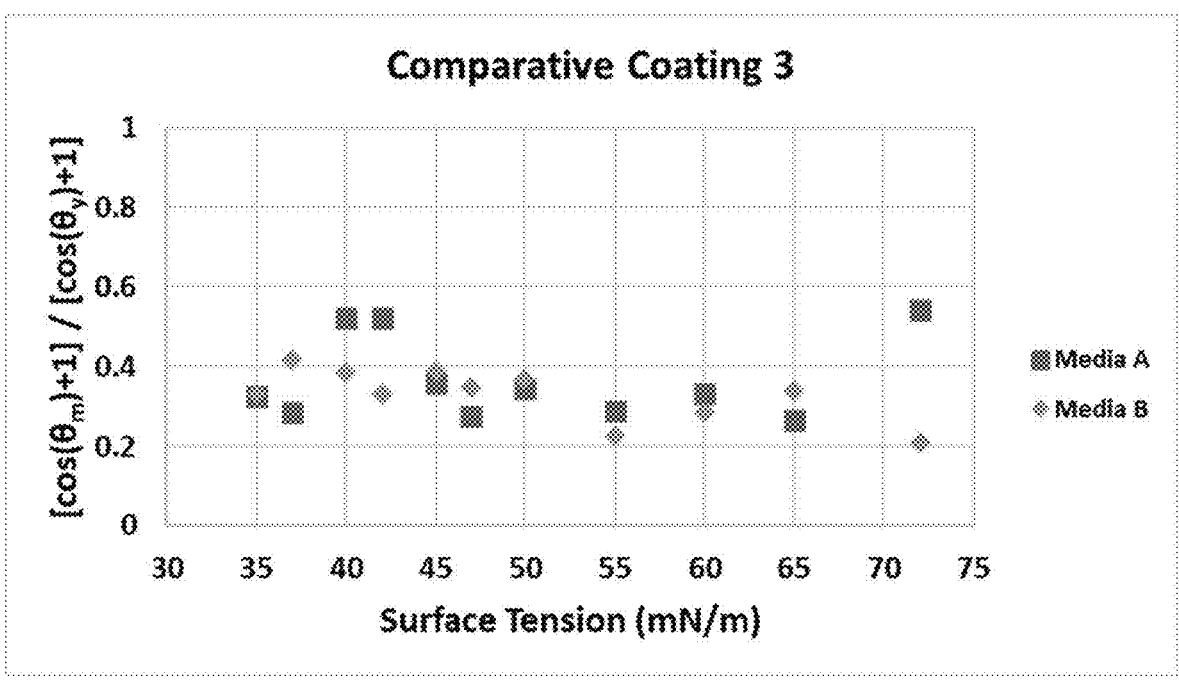
Figure 6B:
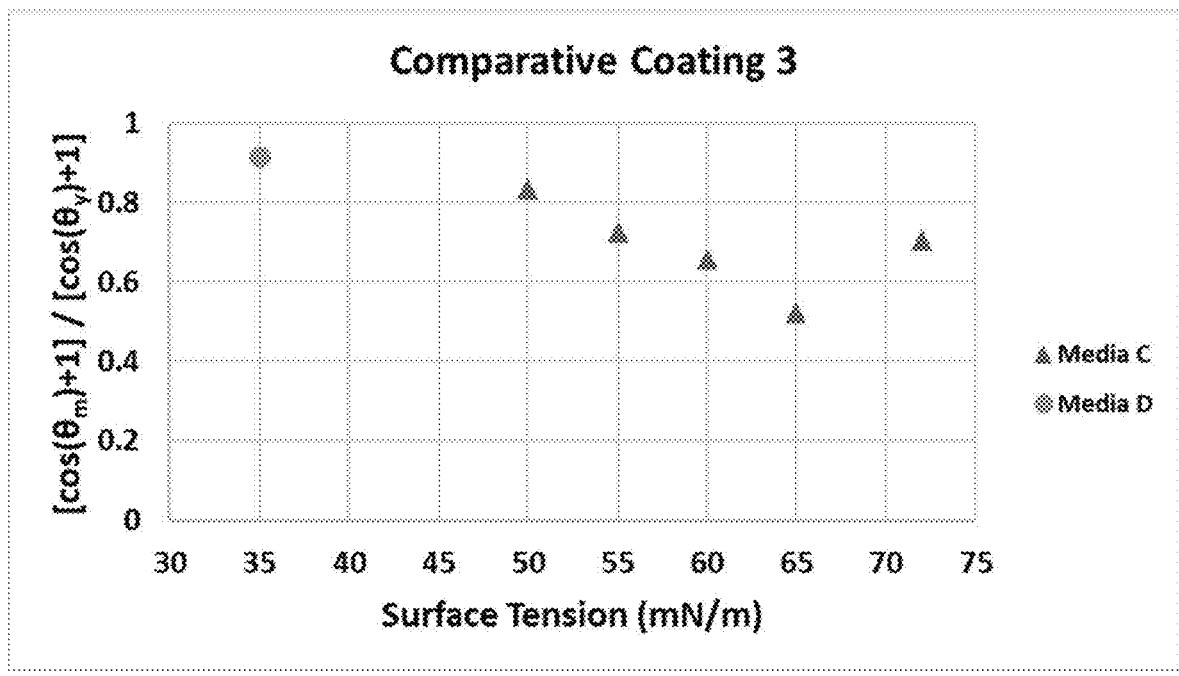
Figure 6C:
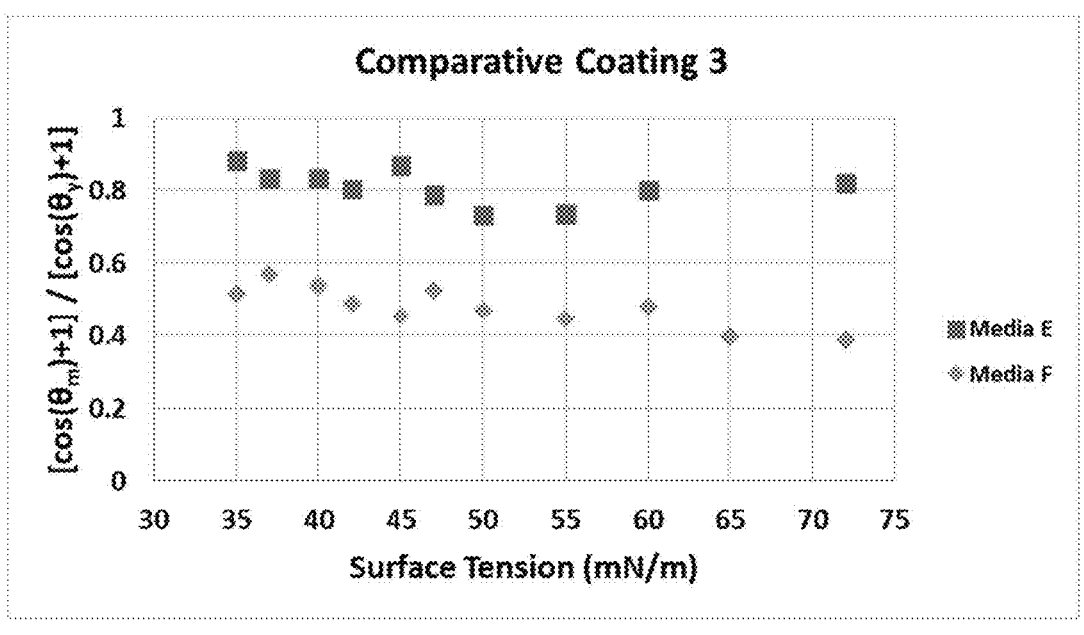
Figure 7:
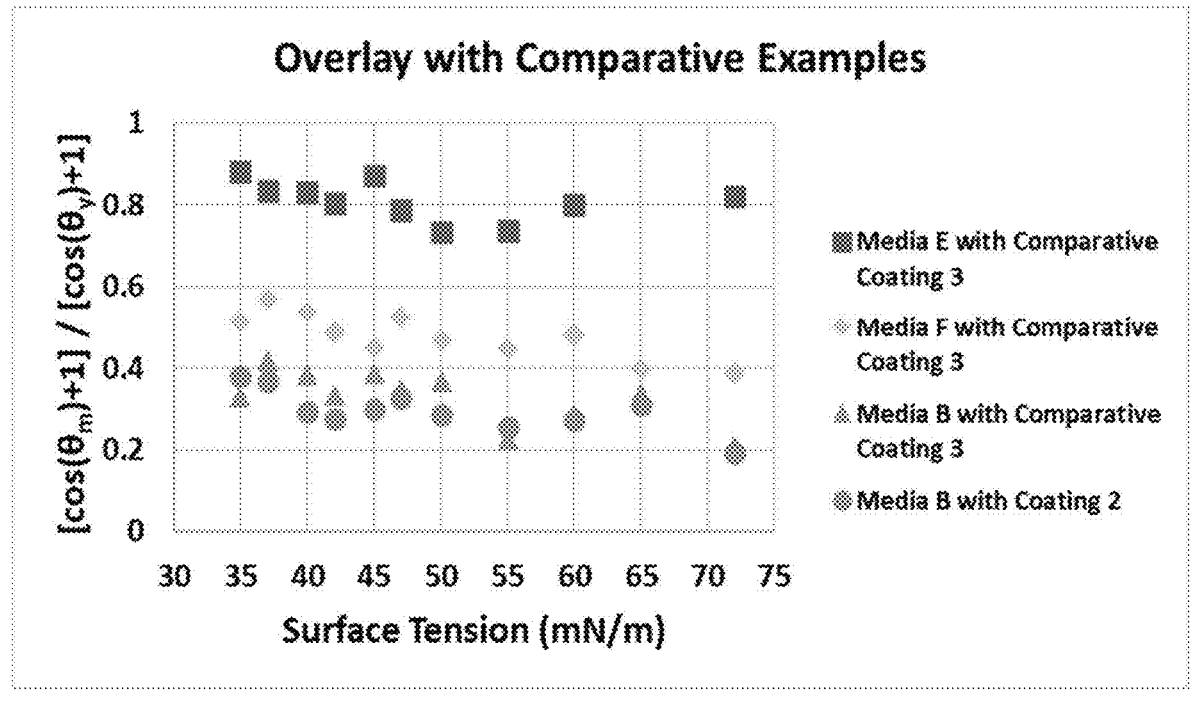

The results are shown in FIGS. 4A (Coating 1 on Media A and B), 4B (Coating 1 on Media C and D), 4C (Coating 1 on Media G); FIGS. 5A (Coating 2 on Media A and B), 5B (Coating 2 on Media C and D), 5C (Coating 2 on Media G); and FIGS. 6A (Coating 3 on Media A and B), 6B (Coating 3 on Media C and D), 6C (Coating 3 on Media G). FIG. 7 shows Media B coated with Coating 2 and Medias B, F, and E coated with Comparative Coating 3.

Example 2

Samples of Media A-D, F, and H were coated with Coatings 1-3 as described in Example 1 and the Frazier permeability of the samples was determined as described in ASTM D737-18, using a Frazier Permeability Tester available from Frazier Precision Instrument Co. Inc., Gaithersburg, Maryland. To measure the permeability for membranes of small pore sizes, the pressure was doubled from 125 to 250 psi to assist in getting a reading. The resulting permeability measurement was then divided by 10 to yield the Frazier permeability. The porosity of the media samples was measured by water-expulsion porosimetry (WEP).

WEP Measurement

A custom fixture was used for WEP measurement. The fixture includes two plates with media samples sandwiched between the plates. The top plate includes six 6.35 mm openings, allowing for six separate measurements. Below each media sample is tubing topped off with distilled water and connected to a manometer with a pressure control valve. The starting air pressure was 1 psi and was increased slowly by 1 psi every 45 seconds. As soon as water was observed on the top of a media sample in the opening (on the atmospheric pressure side), the pressure was recorded as the WEP result.

The permeability and porosity results are shown in TABLES 2A and 2B, respectively.

TABLE 2A

| Substrate | Frazier Permeability | | | |
|---|---|---|---|---|
| | Uncoated | Coating 1 | Coating 2 | Coating 3 |
| Media A | 0.292 | 0.222 | 0.236 | 0.275 |
| Media B | 0.62 | 0.495 | 0.557 | 0.633 |
| Media C | 0.212 | 0.1 | — | 0.196 |
| Media D | 0.462 | 0.35 | 0.335 | 0.36 |
| Media H | 0.11 | 0.0952 | 0.0927 | 0.0988 |

TABLE 2B

| Substrate | WEP | | | | | |
|---|---|---|---|---|---|---|
| | Coating 1 | Std Deviation | Coating 2 | Std Deviation | Coating 3 | Std Deviation |
| Media A | 3.1 | 1.5 | 1.85 | 0.344 | 13.03 | 5 |
| Media B | 2.25 | 0.75 | 1.53 | 0.15 | 6.7 | 4.11 |
| Media C | 11.2 | 1.18 | — | — | 14.14 | 4.76 |
| Media D | 13.4 | 4.71 | 10.5 | 0.31 | 22.1 | 1.25 |
| Media H | 4.2 | 2.57 | 2.8 | 1.3 | 44.65 | 4.52 |

Example 3

Samples of Media I and J were coated with Coatings 1, 2, 7, and 8 as described in Example 1 and the contact angle and Frazier permeability were determined as explained in Examples 1 and 2. The results (including permeability retention of the coated media) are shown in TABLES 3A (Media I) and 3B (Media J) below.

TABLE 3A

| | | Media I. | | | | | | | | | | |
|---|---|---|---|---|---|---|---|---|---|---|---|---|
| | Coating 1 | | | Coating 2 | | | Coating 7 | | | Coating 8 | | |
| Conc. (w/v %) | Angle | Perm | Perm Ret. | Angle | Perm | Perm Ret. | Angle | Perm | Perm Ret. | Angle | Perm | Perm Ret. |
| 1 | 146 | 0.33 | 89% | 145 | 0.338 | 91% | no result | 0.345 | 93% | 74 | 0.289 | 78% |
| 2 | 143 | 0.303 | 181% | 139 | 0.32 | 86% | no result | 0.317 | 85% | 128 | 0.266 | 72% |
| 3 | 141 | 0.265 | 71% | 150 | 0.312 | 84% | 142 | 0.334 | 90% | 13 | 0.0043 | 1% |
| 4 | 139 | 0.302 | 81% | 137 | 0.306 | 82% | 145 | 0.31 | 83% | 142 | 0.115 | 31% |
| 5 | 138 | 0.24 | 65% | 149 | 0.284 | 76% | 142 | 0.273 | 73% | 133 | 0.27 | 73% |

TABLE 3B

| | | Media J. | | | | | | | | | | |
|---|---|---|---|---|---|---|---|---|---|---|---|---|
| | Coating 1 | | | Coating 2 | | | Coating 7 | | | Coating 8 | | |
| Conc. (w/v %) | Angle | Perm | Perm Ret. | Angle | Perm | Perm Ret. | Angle | Perm | Perm Ret. | Angle | Perm | Perm Ret. |
| 1 | 135 | 1.61 | 91% | 1381 | 1.55 | 88% | no result | 1.89 | 107% | 132 | 1.87 | 106% |
| 2 | 131 | 1.39 | 79% | 1391 | 1.74 | 99% | 148 | 1.57 | 89% | 142 | 1.32 | 75% |
| 3 | 1431 | 1.47 | 84% | 145 | 1.49 | 85% | 139 | 1.6 | 91% | 143 | 1.39 | 79% |
| 4 | 1341 | 1.44 | 82% | 139 | 1.4 | 80% | 136 | 1.71 | 97% | 149 | 0.85 | 48% |
| 5 | 135 | 1.39 | 79% | 143 | 1.45 | 82% | 136 | 1.03 | 59% | 147 | 1.57 | 89% |

Example 4

The influence of emulsion particle viscosity on the permeability was evaluated by coating a media sample (Media H) with coatings exhibiting different levels of emulsion particle viscosity (Coatings 4-6). The viscosities of the emulsion particles were reported by the supplier (CHT Group). The coating compositions were also prepared at different concentrations of the emulsion. The particle size of the emulsions (emulsion droplet size) was measured by dynamic light scattering. The particle sizes ranged between 215 nm and 260 nm.

Figure 8:
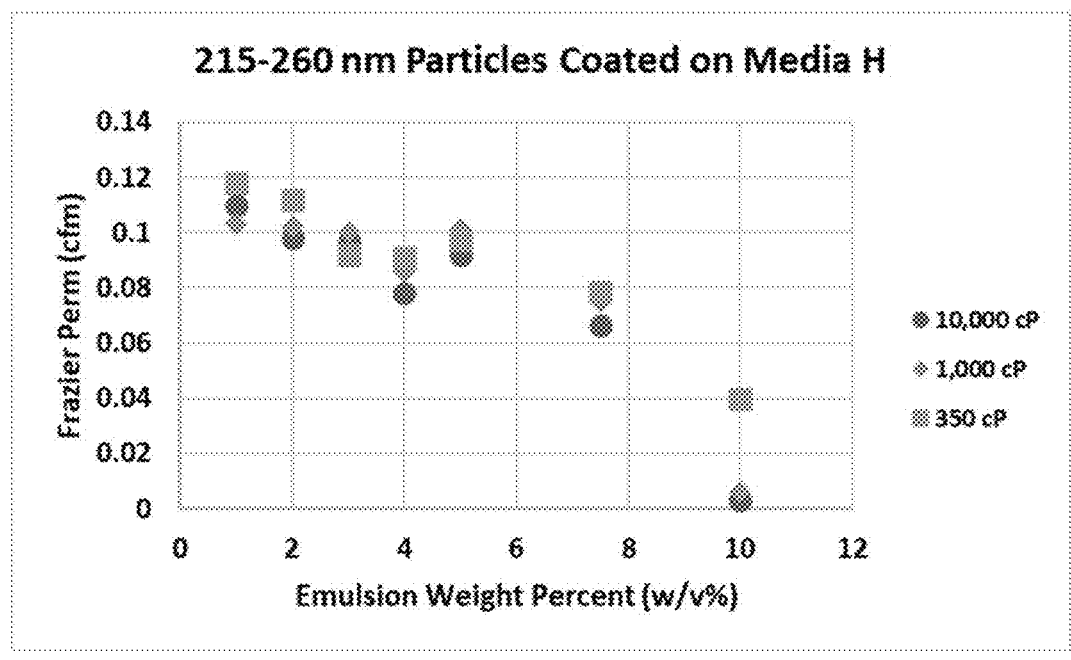
FIG. 8 is a graphical representation of data from Example 3.

The permeability results are shown in FIG. 8. It was observed that low viscosity PDMS or uncured PDMS can coat small pores with ease up to about 5 weight percent with only moderate loss of permeability. It was further observed that the PDMS viscosity had a greater impact on the permeability retention than the particle size. As long as the viscosity is low (e.g., before curing), large particle size emulsions did not clog smaller pores.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

The invention claimed is:

1. An article comprising:
a permeable material having a surface; and
a hydrophobic coating on the surface forming a hydrophobic surface, the hydrophobic coating being free of fluorine, and the hydrophobic surface having a water-contact angle of 95 degrees or greater.

2. The article of claim 1, wherein the hydrophobic surface has a water contact angle of 100 degrees or greater.

3. The article of claim 1, wherein the hydrophobic surface exhibits a roll-off angle of 20 degrees or lower.

4. The article of claim 1, wherein the hydrophobic surface exhibits a wetted fraction of 0.96 or smaller in contact with a liquid having a surface tension of 40 mN/m or greater.

5. The article of claim 1, wherein the permeable material comprises a phase-inverted membrane.

6. The article of claim 1, wherein the surface exhibits a nodular secondary structure.

7. The article of claim 1, wherein the permeable material comprises cellulose acetate, PES, or a combination thereof.

8. The article of claim 1, wherein the hydrophobic coating is crosslinked.

9. The article of claim 1, wherein the hydrophobic coating comprises siloxane.

10. The article of claim 1, wherein the article is a permeable membrane.

11. A vent comprising:

a permeable material having a surface; and a hydrophobic coating on the surface forming a hydrophobic surface, the hydrophobic coating being free of fluorine, and the hydrophobic surface having a water-contact angle of 95 degrees or greater.

12. The vent of claim 11, wherein the hydrophobic surface has a water contact angle of 100 degrees or greater.

13. The vent of claim 11, wherein the hydrophobic surface exhibits a roll-off angle of 20 degrees or lower.

14. The vent of claim 11, wherein the hydrophobic surface exhibits a wetted fraction of 0.96 or smaller in contact with a liquid having a surface tension of 40 mN/m or greater.

15. The vent of claim 11, wherein the permeable material comprises a phase-inverted membrane.

16. The vent of claim 11, wherein the permeable material comprises cellulose acetate, PES, or a combination thereof.

17. The vent of claim 11, wherein the hydrophobic coating is crosslinked.

18. The vent of claim 11, wherein the hydrophobic coating comprises siloxane.

19. The vent of claim 11, wherein the vent is free of fluorine.

20. A vented cap comprising:

a cap constructed for use on a container; and the vent of claim 11.

21. A method of making a hydrophobic article, the method comprising:

applying a hydrophobic material onto a permeable material; and curing the hydrophobic material to form a hydrophobic surface, the hydrophobic material being free of fluorine, and the hydrophobic surface having a water-contact angle of 95 degrees or greater.

22. The method of claim 21, wherein the hydrophobic material is applied by dip coating or chemical vapor deposition.

23. The method of claim 21, wherein the hydrophobic material is applied in the form of an emulsion comprising the hydrophobic material.

24. The method of claim 21, wherein the emulsion comprises an aqueous carrier and optionally one or more surfactants.

25. The method of claim 21, wherein the curing of the hydrophobic material comprises crosslinking the hydrophobic material.

26. The method of claim 21, wherein the hydrophobic material comprises siloxane.

27. The method of claim 21, wherein the hydrophobic surface has a water contact angle of 100 degrees or greater.

28. The method of claim 21, wherein the hydrophobic surface exhibits a roll-off angle of 20 degrees or lower.

29. The method of claim 21, wherein the hydrophobic surface exhibits a wetted fraction of 0.96 or smaller in contact with a liquid having a surface tension of 40 mN/m or greater.

30. The method of claim 21, wherein the permeable material comprises cellulose acetate, PES, or a combination thereof.

31. The method of claim 21, wherein prior to application of the hydrophobic material onto the permeable material, the permeable material has an initial permeability and after application of the hydrophobic material onto the permeable material, the permeable material has a final permeability, wherein the final permeability is at least 50% of the initial permeability.

* * * * *